(12) United States Patent
Homma et al.

(10) Patent No.: US 9,761,277 B2
(45) Date of Patent: Sep. 12, 2017

(54) PLAYBACK STATE CONTROL BY POSITION CHANGE DETECTION

(71) Applicant: SONY CORPORATION, Tokyo (JP)

(72) Inventors: Fuminori Homma, Tokyo (JP); Tatsushi Nashida, Kanagawa (JP); Yasushi Okumura, Tokyo (JP)

(73) Assignee: SONY CORPORATION, Minato-Ku, Tokyo (JP)

( * ) Notice: Subject to any disclaimer, the term of this patent is extended or adjusted under 35 U.S.C. 154(b) by 0 days.

(21) Appl. No.: 14/438,205

(22) PCT Filed: Sep. 13, 2013

(86) PCT No.: PCT/JP2013/074910
§ 371 (c)(1),
(2) Date: Apr. 23, 2015

(87) PCT Pub. No.: WO2014/069114
PCT Pub. Date: May 8, 2014

(65) Prior Publication Data
US 2015/0248919 A1 Sep. 3, 2015

(30) Foreign Application Priority Data

Nov. 1, 2012 (JP) ................................. 2012-241696

(51) Int. Cl.
*H04N 5/76* (2006.01)
*G11B 27/34* (2006.01)
(Continued)

(52) U.S. Cl.
CPC .............. *G11B 27/34* (2013.01); *G06F 3/048* (2013.01); *G06F 3/0482* (2013.01);
(Continued)

(58) Field of Classification Search
CPC ... G11B 27/28; G11B 27/34; G06F 17/30817; G06F 17/30017; G06F 17/30796;
(Continued)

(56) References Cited

U.S. PATENT DOCUMENTS

| 5,696,905 | A | * | 12/1997 | Reimer | ............. | G06Q 30/0623 |
|||||||348/E7.069|
| 5,701,153 | A | * | 12/1997 | Reichek | ............... | H04N 5/9206 |
|||||||348/14.1|

(Continued)

FOREIGN PATENT DOCUMENTS

| JP | 2003-018491 A | 1/2003 |
|---|---|---|
| JP | 2007-317168 A | 12/2007 |

(Continued)

*Primary Examiner* — David Harvey
(74) *Attorney, Agent, or Firm* — Chip Law Group

(57) ABSTRACT

There is provided an information processing apparatus including a position change detecting unit that detects a position change of an operating body on a screen, a playback state control unit that controls a playback state of a content, and a display control unit that at least displays a part or all of a text list in which text data items associated with elapsed times in a playback of the content are sorted in an order of the elapsed times, on the screen. The playback state control unit controls the playback state of the content in response to a continuous position change of the operating body detected by the position change detecting unit on the text list displayed by the display control unit.

14 Claims, 26 Drawing Sheets

(51) Int. Cl.

| | | |
|---|---|---|
| *G06F 3/0488* | (2013.01) | |
| *G06F 3/048* | (2013.01) | |
| *G09B 5/06* | (2006.01) | |
| *G09B 19/06* | (2006.01) | |
| *H04N 21/4728* | (2011.01) | |
| *H04N 21/472* | (2011.01) | |
| *H04N 21/488* | (2011.01) | |
| *G06F 3/0482* | (2013.01) | |
| *G06F 3/0484* | (2013.01) | |
| *G06F 3/0485* | (2013.01) | |
| *G11B 27/10* | (2006.01) | |
| *G11B 27/32* | (2006.01) | |
| *H04N 21/414* | (2011.01) | |
| *H04N 21/422* | (2011.01) | |

(52) U.S. Cl.
CPC .......... *G06F 3/0485* (2013.01); *G06F 3/0488* (2013.01); *G06F 3/04847* (2013.01); *G09B 5/06* (2013.01); *G09B 19/06* (2013.01); *G11B 27/102* (2013.01); *G11B 27/327* (2013.01); *H04N 21/4728* (2013.01); *H04N 21/47214* (2013.01); *H04N 21/47217* (2013.01); *H04N 21/4884* (2013.01); *H04N 5/76* (2013.01); *H04N 21/41407* (2013.01); *H04N 21/42224* (2013.01)

(58) Field of Classification Search
CPC ............... G06F 3/0485; G06F 3/04855; G06F 3/04847; G06F 3/0488; H04N 21/4884; H04N 5/76; H04N 21/41407; H04N 21/42224
USPC ......................................................... 386/242
See application file for complete search history.

(56) References Cited

U.S. PATENT DOCUMENTS

| | | | | |
|---|---|---|---|---|
| 6,061,056 A * | 5/2000 | Menard | ................ | H04N 5/4401 348/E5.108 |
| 6,112,172 A * | 8/2000 | True | ................. | G06F 17/30017 704/235 |
| 8,332,530 B2 * | 12/2012 | Wei | ...................... | G06F 3/0481 707/769 |
| 8,671,359 B2 * | 3/2014 | Koizumi | ............... | G06F 3/0485 345/213 |
| 8,995,767 B2 * | 3/2015 | Graham | ........... | G06F 17/30017 382/173 |
| 2003/0090507 A1 * | 5/2003 | Randall | ................... | H04N 7/163 715/731 |
| 2006/0002684 A1 * | 1/2006 | Champel | ............. | G11B 27/105 386/243 |
| 2006/0179403 A1 * | 8/2006 | Kirkpatrick | ........... | G06F 17/241 715/202 |
| 2008/0235583 A1 * | 9/2008 | Ostergaard | ............. | G11B 27/34 386/343 |
| 2009/0060452 A1 * | 3/2009 | Chaudhri | ............... | H04N 5/445 386/239 |
| 2009/0128500 A1 * | 5/2009 | Sinclair | ............... | G06F 3/04883 345/173 |
| 2010/0269038 A1 * | 10/2010 | Tsuda | .................... | G06F 3/0485 715/702 |
| 2010/0293465 A1 * | 11/2010 | Kleinschmidt | ... | G06F 17/30796 715/719 |
| 2011/0154196 A1 * | 6/2011 | Icho | ...................... | G06F 3/0485 715/702 |
| 2011/0184738 A1 * | 7/2011 | Kalisky | .................. | G06F 3/167 704/260 |
| 2012/0030625 A1 * | 2/2012 | Miyazaki | .............. | G06F 3/0488 715/830 |
| 2012/0030636 A1 * | 2/2012 | Miyazaki | .............. | G06F 3/0488 715/863 |
| 2012/0047437 A1 * | 2/2012 | Chan | ...................... | G06F 3/0482 715/720 |
| 2012/0315009 A1 * | 12/2012 | Evans | .................... | H04N 5/765 386/230 |
| 2013/0177891 A1 * | 7/2013 | Hammerschmidt | ..... | G09B 5/06 434/309 |
| 2013/0205213 A1 * | 8/2013 | Mitros | .................... | G06F 3/048 715/719 |
| 2013/0308922 A1 * | 11/2013 | Sano | .................. | H04N 21/4316 386/245 |
| 2015/0016801 A1 * | 1/2015 | Homma | ................. | G06F 3/0485 386/243 |

FOREIGN PATENT DOCUMENTS

| | | |
|---|---|---|
| JP | 2009-159126 A | 7/2009 |
| JP | 2009-206724 A | 9/2009 |
| JP | 2012-033060 A | 2/2012 |
| WO | 2012-027270 A1 | 3/2012 |

* cited by examiner

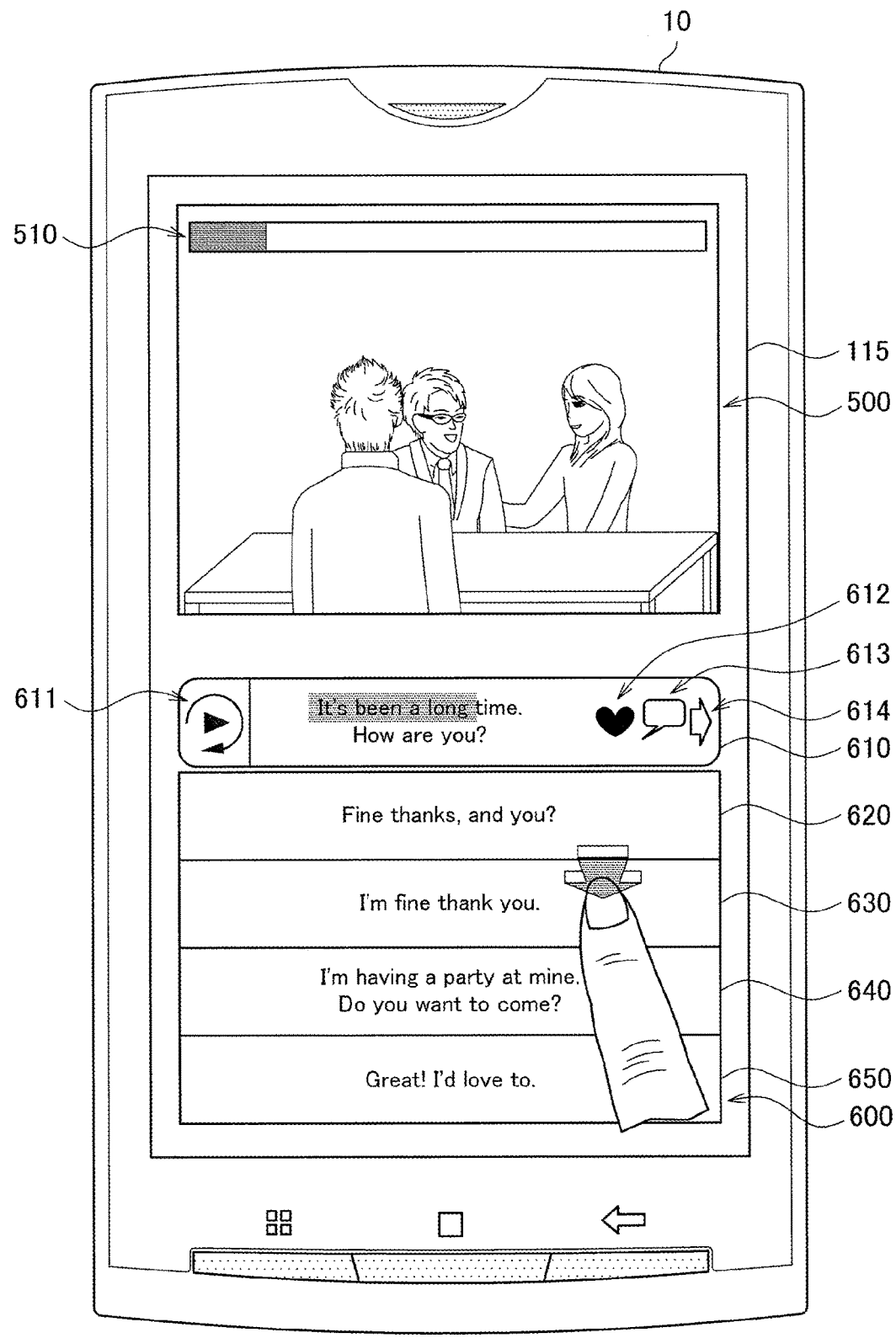

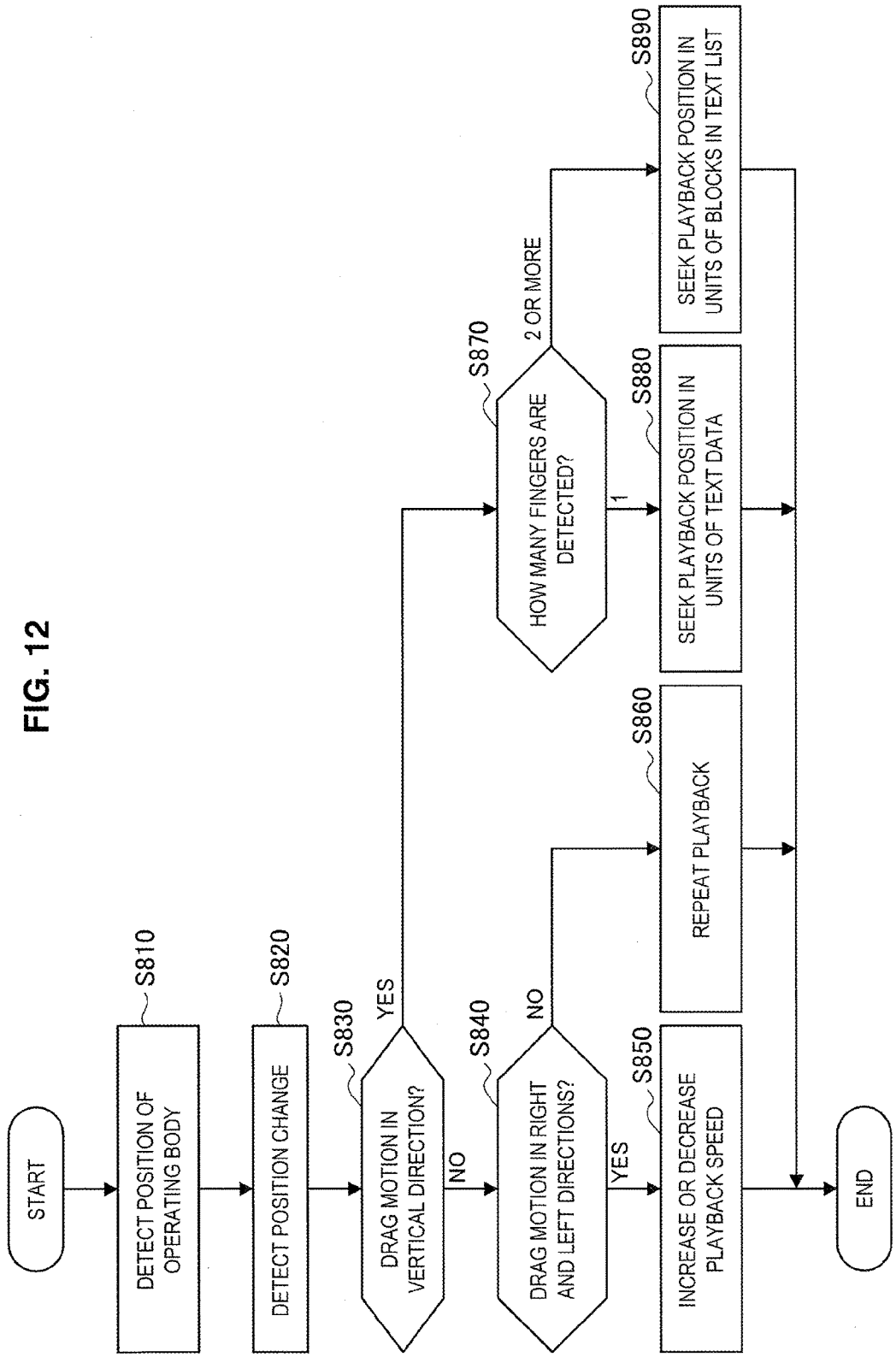

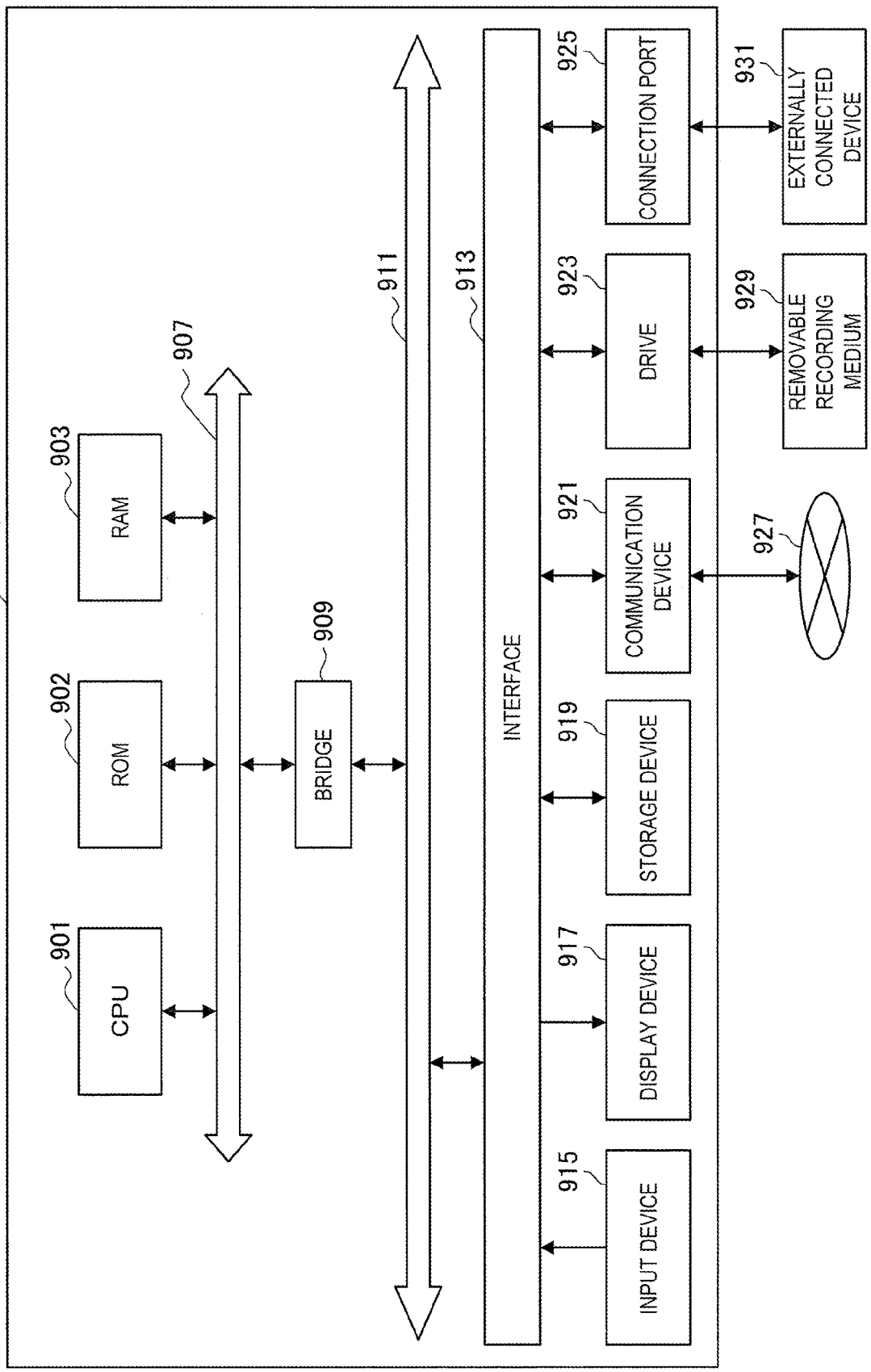

PLAYBACK STATE CONTROL BY POSITION CHANGE DETECTION

TECHNICAL FIELD

The present disclosure relates to an information processing apparatus, a playback state controlling method, and a program.

BACKGROUND ART

In recent years, a way of enjoying has been widespread in which a viewer (user) takes data on a content (content data) such as music or a video, in a terminal such as a personal computer (PC) and a smartphone, and enjoys the content at a desired timing. For this reason, techniques for enhancing the convenience of a user in the playback of a content have been actively developed.

For example, Patent Literature 1 discloses a technique of automatically tagging an audiovisual file appropriately to allow a user to easily access a desired audiovisual file. In addition, Patent Literature 2 discloses a technique of, in a device provided with a touch panel, displaying a cursor that supports a dragging (tracing) operation on a screen, and displaying the cursor while making the shape of the cursor at the starting point of the drag operation differ from that at the end point to allow a user to perform a playback operation on a music piece file or a video image file intuitively.

CITATION LIST

Patent Literature

Patent Literature 1: JP 2007-317168A
Patent Literature 2: JP 2012-033060A

SUMMARY OF INVENTION

Technical Problem

Meanwhile, the variety of ways in which a user views a content has been increasing. For example, in viewing a content, finer controls of the playback state of the content respecting the demands of the user are required, such as seeking a playback position, performing repeat playback on a certain scene, and changing a playback speed like slow motion playback and high-speed playback. In view of such a circumstance, it is desirable to, with respect to the control of the playback state of the content, further enhance the convenience of the user.

Thus, the present disclosure proposes a novel and improved information processing apparatus, playback state controlling method, and program that can further enhance the convenience of a user with respect to the control of the playback state of a content.

Solution to Problem

According to an embodiment of the present disclosure, there is provided an information processing apparatus including a position change detecting unit that detects a position change of an operating body on a screen, a playback state control unit that controls a playback state of a content, and a display control unit that at least displays a part or all of a text list in which text data items associated with elapsed times in a playback of the content are sorted in an order of the elapsed times, on the screen. The playback state control unit controls the playback state of the content in response to a continuous position change of the operating body detected by the position change detecting unit on the text list displayed by the display control unit.

According to another embodiment of the present disclosure, there is provided a playback state controlling method including displaying a part or all of a text list in which text data items associated with elapsed times in a playback of a content are sorted in an order of the elapsed times, on a screen, detecting a continuous position change of an operating body on the text list displayed on the screen, and controlling a playback state of the content in response to the continuous position change of the operating body.

According to another embodiment of the present disclosure, there is provided a program causing a computer to execute displaying a part or all of a text list in which text data items associated with elapsed times in a playback of a content are sorted in an order of the elapsed times, on a screen, detecting a continuous position change of an operating body on the text list displayed on the screen, and controlling a playback state of the content in response to the continuous position change of the operating body.

According to one or more embodiments of the present disclosure, the position change detecting unit detects the position change of the operating body on a screen. In addition, a playback control unit controls the playback state of the content. In addition, the display control unit at least displays a part or all of a text list in which text data items associated with elapsed times in the playback of the content are sorted in an order of elapsed times on a screen. Furthermore, the playback state control unit controls the playback state of the content in response to continuous position change of the operating body, on the text list that is displayed on the screen by the display control unit, that is detected by the position change detecting unit.

Advantageous Effects of Invention

As described above, according to the present disclosure, it is possible to further enhance the convenience of a user, with respect to the control of the playback state of a content.

BRIEF DESCRIPTION OF DRAWINGS

FIG. 12 is a flow chart showing an example of a playback state controlling method according to the present embodiment.

FIG. 15 is a functional block diagram showing an example of a hardware configuration of an information processing apparatus according to the present embodiment.

DESCRIPTION OF EMBODIMENTS

Figure 1:
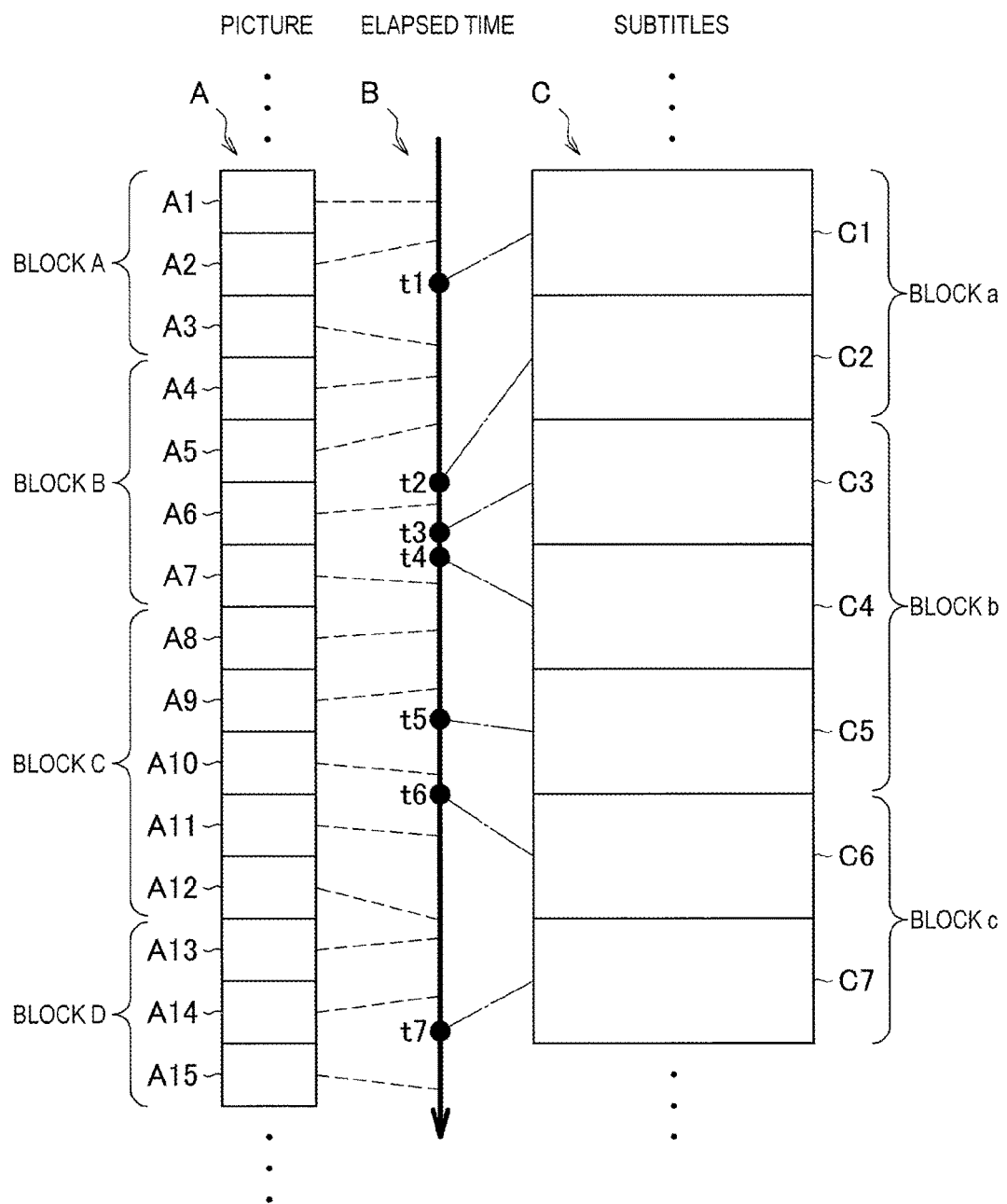
FIG. 1 is an explanatory diagram for illustrating playback state control of a content utilizing a text list according to an embodiment of the present disclosure.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that the description will be made in the following order.
1. Playback State Control Utilizing Text List
2. Outline of Operating Method
3. Functions and Configuration of Information Processing Apparatus
4. Example of Playback State Control Utilizing Text List
  4.1. Seeking Playback Position
  4.2. Repeat Playback
  4.3. High-Speed Playback and Slow Motion Playback
5. Process Flow in Playback State Controlling Method
6. Modification of Playback State Control Utilizing Text List
  6.1. Utilizing Social Comment
  6.2. Hiding Text List
  6.3. Other modifications
7. Hardware Configuration
8. Conclusion 1. Playback State Control Utilizing Text List There is a demand that, when a user plays back and views a content, the user wants to control the playback state of the content more minutely and more intuitively. Here, the playback state control of the content is to control various operations for the playback of the content, and includes for example, controlling the operations such as (normal) playback, stop, pause, fast-forward, rewind, high-speed playback, slow-motion playback, and repeat playback of the content. In addition, the playback state control of a content includes controls with respect to the operation of playing back the content from any playback position.

For example, there are some conceivable methods of playing back a content from any playback position as an example of the playback state control, that is, seeking a desired playback position. Generally known methods of seeking a playback position in a content include a method of seeking a playback position based on an elapsed time in the playback of the content, and a method of seeking a playback position based on picture data contained in the content if the content is a video file.

In contrast, in an information processing apparatus, a playback state controlling method, and a program according to an embodiment of the present disclosure, the playback of a content is controlled based on a text list. Here, the text list is a list in which text data items associated with elapsed times in the playback of the content are sorted in an order of the elapsed time.

First, referring to FIGS. 1 to 3, the outline of a playback state control of a content utilizing a text list according to an embodiment of the present disclosure will be described, and the comparison with the above-described other methods of seeking a playback position will be made. Note that, in the following description, the present embodiment will be described by way of example in which the content is a video file, and the text data is subtitles corresponding to the video file. It should be understood that, in the information processing apparatus, the playback state controlling method, and the program according to the present embodiment, intended contents are not limited to video files, and may be the other kinds of contents such as a music file. In addition, the text data is not limited to subtitles either, and may be, for example, the other kinds of text data such as lyric data corresponding to the music file.

Figure 2:
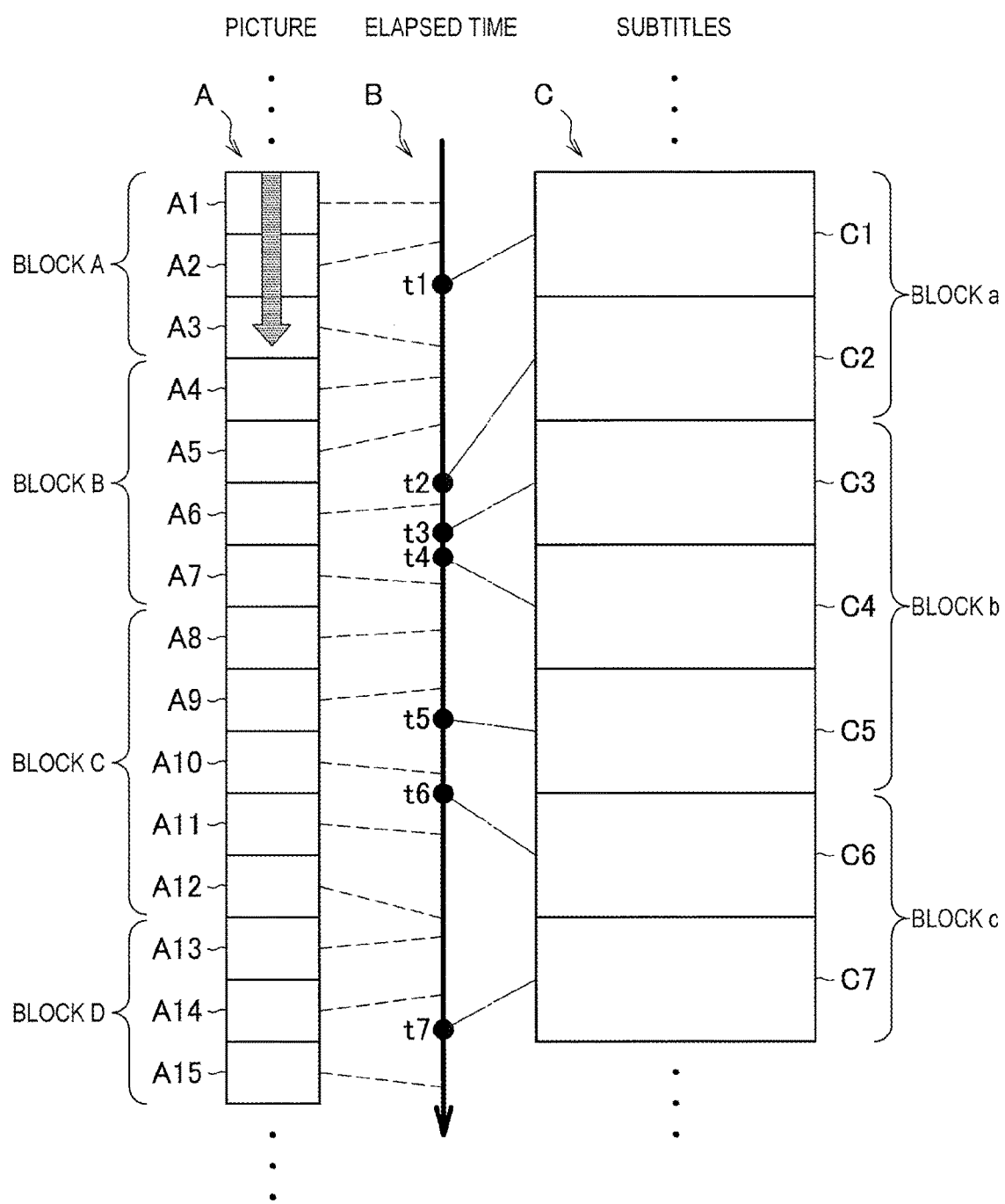
FIG. 2 is an explanatory diagram for illustrating playback state control of a content utilizing a text list according to an embodiment of the present disclosure.
Figure 3:
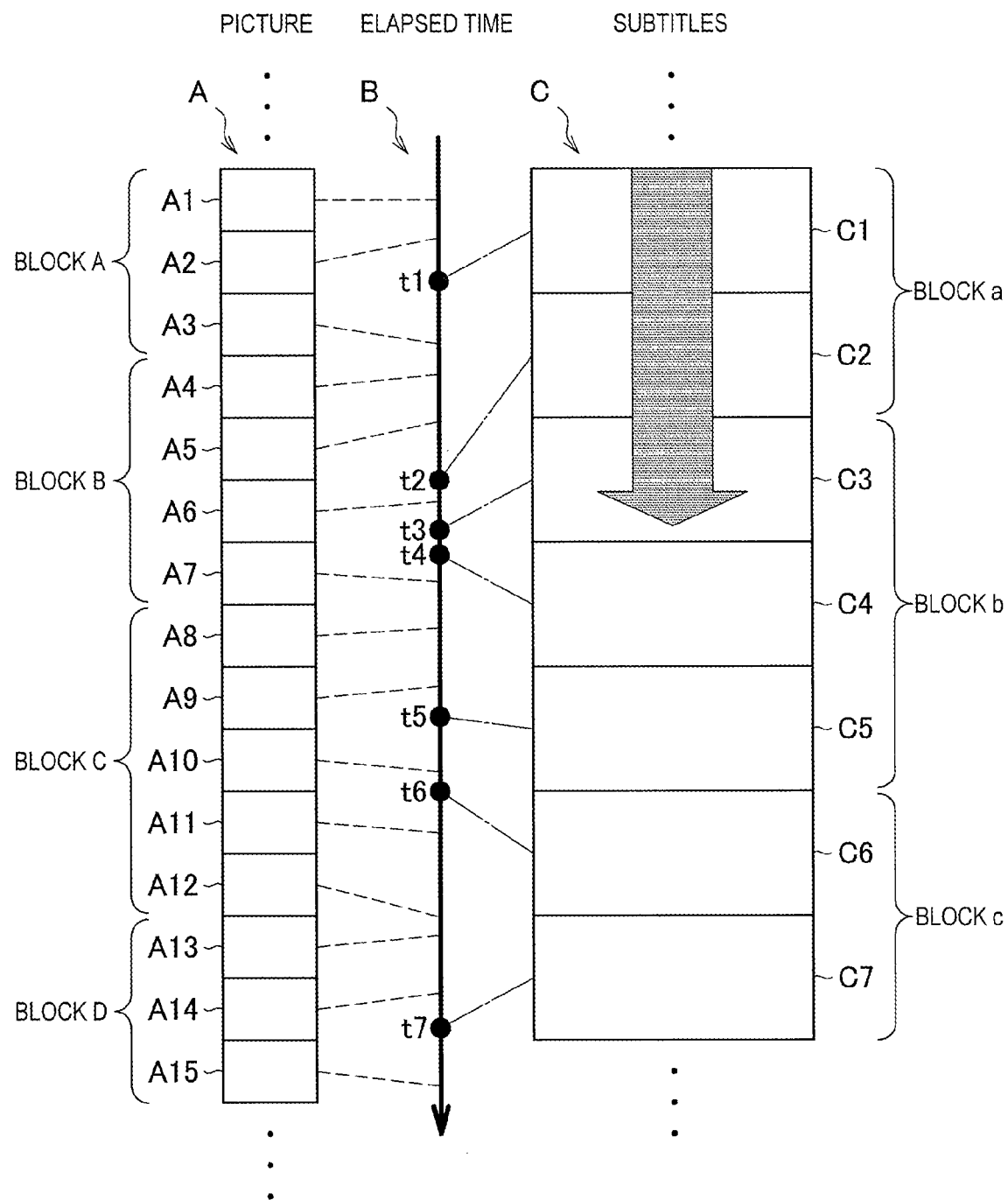
FIG. 3 is an explanatory diagram for illustrating playback state control of a content utilizing a text list according to an embodiment of the present disclosure.

FIGS. 1 to 3 are explanatory diagrams for illustrating the playback state control of the content utilizing the text list according to an embodiment of the present disclosure. Referring to FIG. 1, there are shown a picture list A in which pictures in the content corresponding to elapsed times in the playback of the content are sorted in chronological order, a time axis B denoting the elapsed time in the playback of the content, and a text list C.

The picture list A includes a plurality of pictures A1, A2, . . . , and A15. The plurality of pictures A1, A2, . . . , and A15 are each configured by a plurality of frames, that is, each have a certain duration, and each represent one of a plurality of parts into which the content is divided. In addition, in FIG. 1, broken lines that extend from respective regions representing the pictures A1, A2, . . . , and A15 to the time axis B indicate that each picture corresponding to the region is which picture an elapsed time on the time axis B corresponds to. That is, the picture list A schematically shows a method of separating the content based on the picture.

In addition, the picture list A is divided into some chunks (blocks), and the content can be separated in units of the blocks. For example, in the example shown in FIG. 1, the picture list A is divided into four blocks, and a block A, a block B, a block C, and a block D contain, pictures A1 to A3, pictures A4 to A7, pictures A8 to A12, and pictures A13 to A15, respectively.

Here, the creation of the picture list A or the division into the above blocks A to D may be, for example, manually performed by a user, or may be automatically performed using common tools. Known common tools include a technique of automatically dividing a picture based on changes in screen layout, brightness, coloration, and the like in displaying the picture, or in response to change in shots.

Meanwhile, the text list C includes a plurality of text data items C1, C2, . . . , and C7. The plurality of text data items C1, C2, . . . , and C7 each have a certain duration, and each represent one of a plurality of parts into which the content is divided. In addition, in FIG. 1, dash-dot lines that extend from respective regions representing the text data items C1, C2, . . . , and C7 to the time axis B indicate that each text data item corresponding to the region is which text data item an elapsed time on the time axis B corresponds to. For example, in the example shown in FIG. 1, the text data item C1 is a text data item corresponding to an elapsed time t1 in the content, and the text data item C2 is a text data item corresponding to an elapsed time t2 in the content. Similarly, the text data items C3, C4, C5, C6, and C7 are text data items corresponding to elapsed times t3, t4, t5, t6, and t7 in the content, respectively. That is, the text list C schematically shows a method of separating the content based on the text data, for example, subtitles.

In addition, the text list C can be divided into some chunks (blocks), and the content can be separated in units of the blocks. For example, in the example shown in FIG. 1, the text list C is divided into three blocks, and a block a, a block b, and a block c contain the text data items C1 and C2, the text data items C3 to C5, and the text data items C6 and C7, respectively.

Note that the division of the text list C into some blocks can be performed according to a predetermined criterion. The predetermined criterion may be a case where a time interval between text data items reaches a certain period of time, for example, one second. For example, if the text data items are a conversation between characters in the content, the occurrence of a certain time interval between text data items means a high possibility of the stop of the conversation. Therefore, considering the time interval between text data items to be a criterion can achieve the division into blocks according to a context. However, the criterion for dividing the text list C into some blocks is not limited to such an example and the other criteria may be used. The criterion for dividing the text list into blocks will be described in detail together with the description of the function of a list processing unit 142, which will be described hereafter in <3. Functions and Configuration of Information Processing Apparatus>.

As seen from the above, conceivable criteria for separating a given content based on elapsed times in the playback of the content include the method of separating based on pictures, and the method of separating based on text data items. Here, the positions of separation by the method of separating a content based on pictures are not necessarily identical to the positions of separation by the method of separating the content based on text data items. That is, the elapsed times corresponding to the pictures A1, A2, . . . , and A15 contained in the picture list A are not necessarily identical to the elapsed times corresponding to the text data items C1, C2, . . . , and C7 contained in the text list C. This is because, for example, a shot is likely changed even in the middle of a series of lines spoken by one character, and a picture is thereby changed.

Here, consider a case where, for example, a user moves a playback position in a content to a desired playback position (seeks a playback position) in its playback. In this case, for example, conceivable methods of seeking the playback position include those based on the picture list A, the time axis B, or the text list C.

First, as shown in FIG. 2, consider the method of seeking the playback position based on the picture list A. An arrow on the picture list A in FIG. 2 means that the playback position is sought based on the picture list A. In this case, the playback position may be sought in the units of the pictures A1, A2, . . . , and A15 contained in the picture list, or may be sought in the units of the above-described blocks A, B, C, and D.

Here, assume that the creation of the picture list A and the division into the above blocks A to D is performed by, for example, the method as described above in which a picture is automatically divided according to the change in a shot. However, when the picture list A is created based on the method, the content may be separated also based on a timing at which, for example, the shot is changed in the middle of the series of lines as described above. Therefore, this does not always achieve the manner of separation according to the context in the content, and thus seeking the playback position based on the picture list A may cause a malfunction in that, for example, starting the playback in the middle of a line. In addition, a method is conceivable in which the picture list is manually crated by a user, but manually creating the picture list A is not efficient for, for example, a content having a large volume (having a long playback period), or a large number of contents.

Next, consider the method of seeking the playback position based on the time axis B. In this case, to seek a desired playback position, a user needs to grasp in advance that the scene that the user wants to view is a scene at what elapsed time. Therefore, the user needs to take in advance a note of a desired scene and elapsed time in an associating manner, which is not an efficient method either.

In contrast, in the information processing apparatus, the playback state controlling method, and the program according to the present embodiment, as shown in FIG. 3, the playback position is sought based on the text list C. An arrow on the text list C in FIG. 3 means that the playback position is sought based on the text list C. The text list C is created based on the text data, which can achieve the manner of separation of the content more according to an intention in a context or a scene. Here, the playback position may be sought in the units of the text data items C1, C2, . . . , and C7 contained in the text list C, or in the units of the above-described blocks a, b, and c.

As described above, in the information processing apparatus, the playback state controlling method, and the program according to the present embodiment, the playback state of the content is controlled based on the text list. Therefore, when seeking a playback position, it is possible to for example, perform a seek respecting more an intention in a context or a scene, which enables more enhanced convenience of a user.

In addition, text data has typically smaller volume than picture data. Therefore, processing of creating a picture list based on picture data costs less than processing of creating a text list based on text data, which enables the list to be created more readily. Therefore, utilizing a text list does not demand a relatively high performance processing device, reducing loads on a user.

In addition, for example, if a content is video data in which a lecture, a speech, or the like is recorded, it is assumed that the picture data is configured by pictures in which a lecturer, a speaker, a screen on which a speech material, for example, is projected, or the like is continuously shoot, where the pictures do not have many changes, and it is thus highly likely that the creation of the picture list is difficult. Nevertheless, when a text list is created based on text data into which the remarks of the lecturer or the speaker are converted, a user can seek a playback position based on the remarks while referring the remarks of the lecturer or the speaker, which allows the user to seek a scene to view more effectively.

2. Outline of Operating Method

Figure 4:
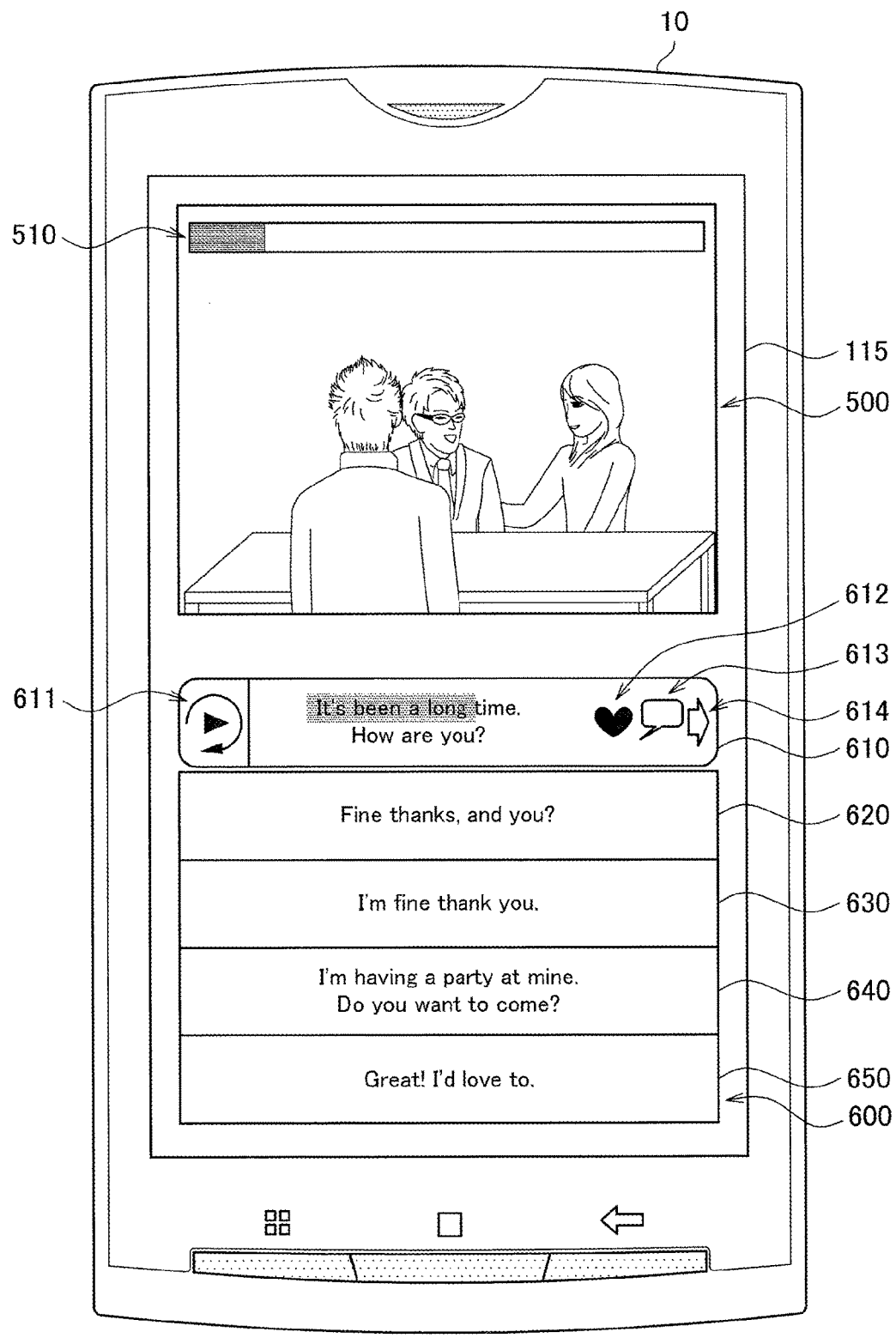
FIG. 4 is a schematic diagram showing an example of an operating method in playback of a content in an information processing apparatus according to the present embodiment.
Figure 5:
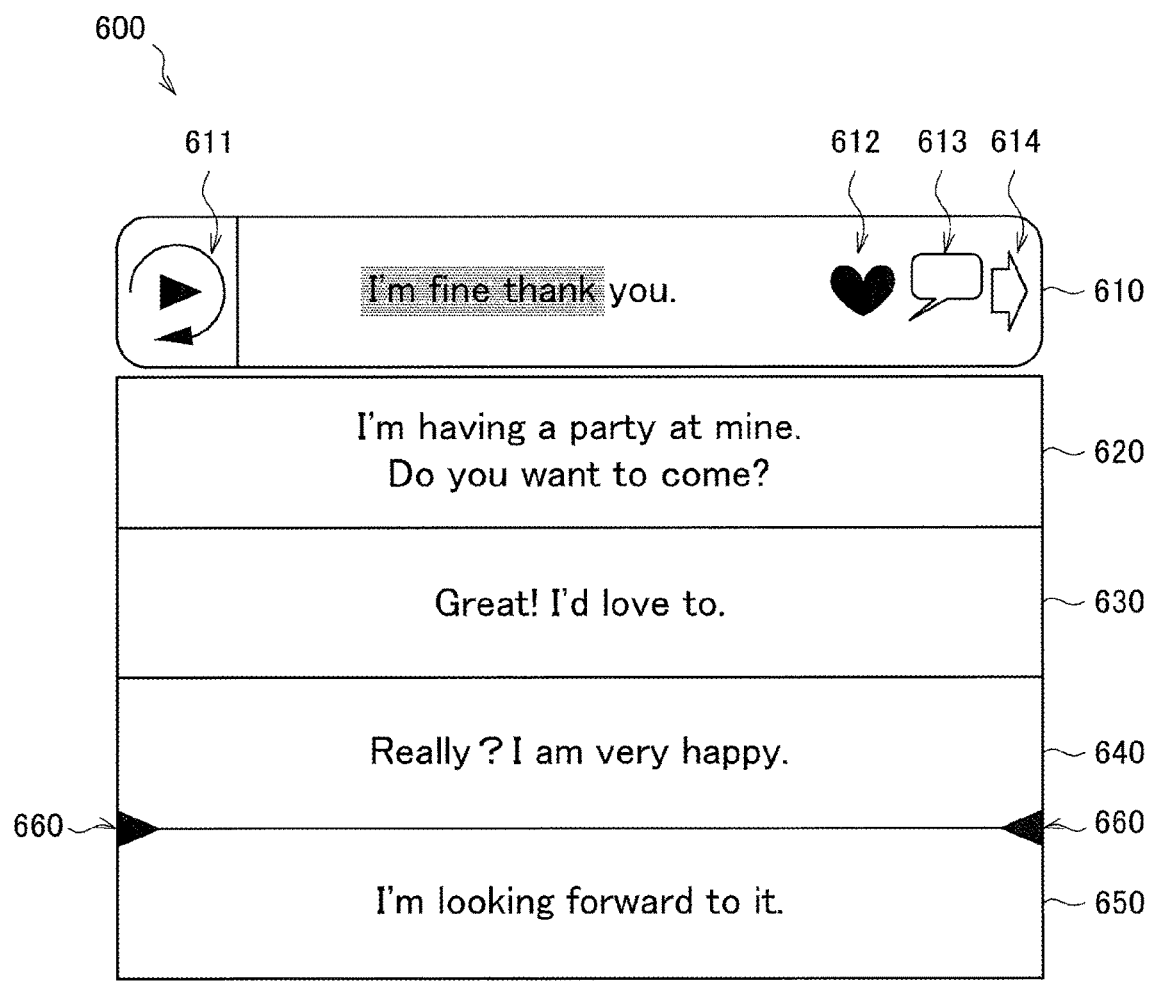
FIG. 5 is a schematic diagram showing a different display example of a text list in a text list displaying region in FIG. 4.

Next, referring to FIG. 4 and FIG. 5, the outline of the operating method of the information processing apparatus according to the embodiment of the present disclosure will be described. FIG. 4 is a schematic diagram showing an example of an operating method in the playback state control of a content in the information processing apparatus according to the embodiment of the present disclosure. FIG. 5 is a schematic diagram showing a different display example of a text list in a text list displaying region in FIG. 4.

Referring to FIG. 4, the information processing apparatus 10 according to the embodiment of the present disclosure may be a device including a touch panel, for example, a smartphone and tablet PC. The information processing apparatus 10 includes a display screen 115 having a touch panel function. The display screen 115 includes a sensor that detects the position of an operating body on a screen, and a user can cause the position of the operating body to be detected on the surface of the display screen 115 to perform various operations. Here, the operating body may be a finger, or may be a tool such as a stylus pen. In addition, the position of the operating body on the display screen 115 may be detected in response to the operating body touching on the surface of the display screen 115, or may be detected in response to the operating body approaching the surface of the display screen 115 with a predetermined distance or less using an optical sensor or the like. In the following description, an expression such as the operating body touching the display screen means that the position of the operating body on the display screen is detected, and whether or not the operating body actually touches the display screen does not matter.

The display screen 115 includes a playback screen display region 500 and a text list displaying region 600. The playback screen display region 500 is a region in which the content is subjected to playback display, and if a content to be played back is, for example, a video file, picture data contained in the video file is displayed therein.

In addition, on the playback screen display region 500, an indicator 510 that indicates a current playback position in the content may be displayed at the same time. The indicator 510 has a shape of a bar extending in the horizontal direction of the screen, and is displayed such that, for example, the bar is painted over from the left edge to the right edge with an elapsed time in the playback of the content. Therefore, a user can grasp the current playback position in the content by referring to the indicator 510. Note that the indicator 510 may be freely switched between displayed and hidden so as not to hinder the user from viewing the content.

In addition, FIG. 4 shows the playback screen display region 500 in the case where the content is a video file, but for example, if the content is a music file, the playback screen display region 500 may display only the indicator 510, not displaying a picture. In addition, if the content is a music file, an image relating to the music file, for example, the image of a singer corresponding to the music file, the jacket image of a CD, or the like may be displayed.

The text list displaying region 600 is a region in which a part or all of a text list is displayed. Text data configuring the text list may be, for example, if the content is a movie, subtitles corresponding to the movie, or may be, if the content is a piece of music, lyrics corresponding to the music. The following description will be made by way of example in which the text list is the list of subtitles corresponding to a video file being the content. Note that, in the following description, the expression "the text list displayed on the display screen" or expressions similar to this may mean "a part displayed on the display screen among the text list," and does not necessarily mean that all of text list is displayed on the display screen.

In the example shown in FIG. 4, in the text list displaying region 600, a part of the text list, for example, five text data items are extracted and displayed. The text list displaying region 600 includes, for example, a focused region 610, a second text displaying region 620, a third text displaying region 630, a fourth text displaying region 640, and a fifth text displaying region 650, and the text data items contained in the text list are displayed one by one in each of these regions.

That is, the second text displaying region 620 displays a text data item that is positioned next to the text data item currently displayed on the focused region 610, in a list order in the text list. Furthermore, the third text displaying region 630 similarly displays a text data item that is positioned next to the text data item currently displayed on the second text displaying region 620, in the list order in the text list. The fourth text displaying region 640 and the fifth text displaying region 650 similarly display text data items that are positioned next to the third text displaying region 630 and the fourth text displaying region 640, respectively in the list order in the text list.

Note that, in the example shown in FIG. 4, the five text data items are extracted and displayed on the text list displaying region 600 from among the text list, but the present embodiment is not limited to such an example. The number of the text data items displayed in the text list displaying region 600 is not especially limited, and may be set, as appropriate, taking into consideration, for example, the size or the like of the display screen 115. In addition, the number of text displaying regions included in the text list displaying region 600 may be changed, as appropriate, as the number of text data items displayed on the text list displaying region 600 increases or decreases.

The focused region 610 is a region in which a text data item corresponding to a picture that is displayed in the playback screen display region 500 at that moment. For example, in the example shown in FIG. 4, in the picture displayed in the playback screen display region 500, there is displayed "It's been a long time. How are you?", which is a line that a character is just speaking, in the focused region 610. In addition, in the display of text data in the focused region 610, a text data item is highlight displayed according to the state of progress in the playback of the content, that is, the state of progress of the picture displayed in the playback screen display region 500. The user can intuitively grasp that a playback position in the content displayed in the focused region 610 at that moment corresponds to which part of text data, by referring to the highlight display.

As the playback of the content progresses, the picture displayed in the playback screen display region 500 progresses and the text list displayed in the text list displaying region 600 changes. That is, the focused region 610 displays text data items corresponding to a picture displayed in the playback screen display region 500 at that moment, and thus as the playback of the content progresses, the text list displayed in the text list displaying region 600 changes in turn in such a manner that the text data item that has been displayed in the second text displaying region 620 is displayed in the focused region 610, and the text data item that has been displayed in the third text displaying region 630 is displayed in the second text displaying region 620. In the following description, how the display of the text data items contained in the text list displayed in the display screen 115 changes in the list order of the text list will be referred to as text list scrolls, unless otherwise specified.

In addition, in the following description, in the text list displayed on the display screen 115, a direction in which the text data items are arranged will be referred to as a list direction. In addition, a direction of the list direction in which the text list scrolls with the playback of the content, that is, a direction toward the focused region 610 will be referred to as a forward direction of the text list. In addition, a direction opposite to the forward direction will be referred to as a reverse direction of the text list. In the example shown in FIG. 4, in the text list displayed in the text list displaying region 600, the vertical direction in FIG. 4 is the list direction, and an upward direction in FIG. 4 is the forward direction of the text list, and a down direction in FIG. 4 is the reverse direction of the text list.

FIG. 5 shows the display example of the text list displaying region 600 in which the playback of the content progresses from the state shown in FIG. 4 and the text list scrolls. Referring to FIG. 5, unlike FIG. 4, a separation point mark 660 is displayed between the fourth text displaying region 640 and the fifth text displaying region 650. The separation point mark 660 is a mark that indicates, in the case where the text list is divided into some blocks, a separation of the blocks. As the text list scrolls, the separation point mark 660 moves accordingly with the scroll.

In addition, although not specifically shown in FIG. 5, when the text list is divided into some blocks, there may be displayed how many text data items will be played back until the playback position reaches the next block, that is, the number of remaining text data items in the block contained in a scene that is currently played back, in the text list displaying region 600 in a countdown manner.

In addition, the focused region 610 may display icons for performing various operations, for the purpose of enhancing the convenience of the user in viewing the content. The user can execute functions allocated to the respective icons by touching these various icons. Referring to FIG. 4 and FIG. 5, the focused region 610 displays, for example, a playback icon 611, a bookmark icon 612, a comment adding icon 613, and a comment list inserting icon 614.

To the playback icon 611, a function is allocated that starts the playback of the content from a playback position corresponding to the beginning position of the text data currently displayed in the focused region 610. The user can view the part corresponding to once again the text data currently displayed in the focused region 610, by touching the playback icon 611.

In addition, to the bookmark icon 612, a function is allocated that registers the text data currently displayed in the focused region 610 as a "favorite." The information processing apparatus 10 may have a function of storing, for example, a predetermined number of text data items as the "favorites," and may have a function of managing the text data items that the user registers as the "favorites," as a favorite list. For example, the user refers to the favorite list and selects a desired text data item, and the playback of the content may be started from the playback position corresponding to the selected text data.

To the comment adding icon 613, a function is allocated that allows the user to add any comment to the content in its playback. In addition, the comment may be associated with an elapsed time in the playback of the content, and for example, if the content is a video file, the comment may be a note that indicates what scene contains a picture that is displayed in the playback screen display region 500 at that moment, or may be an impression of the scene. In addition, the comment may be a so-called social comment, and may be shared among a large number of unspecified users, or a plurality of other users specified by the user.

To the comment list inserting icon 614, a function is allocated that inserts the list of comments that is added using the comment adding icon 613, onto the display screen 115. The comments added using the comment adding icon 613 may be, as described above, a kind of text data items that are associated with elapsed times in the playback of the content. That is, the comments can configure a text list of the other kind that is different from the text list displayed in the example shown in FIG. 4. By using the comment list inserting icon 614, a text list to be displayed on the display screen 115 can be switched in the case where a plurality of text lists different from one another are present with respect to the same content.

In addition, in FIG. 4 and FIG. 5, although not shown as an icon, the information processing apparatus 10 may have a dictionary function in which, in response to the selection of a word contained in a text data item displayed in the text list displaying region 600, the meaning of the word or information such as a word or the like, corresponding to the word, in the other language.

In addition, the information processing apparatus 10 can detect the position change of the operating body on the text list displayed in the text list displaying region 600, change the display of the text list in response to the position change, and control the playback state of the content. For example, on the text list displayed in the text list displaying region 600, when the position change of the operating body in the list direction of the text list, that is, in the vertical direction in FIG. 4 is detected, the text list displayed in the text list displaying region 600 is scrolled in the forward direction or the reverse direction in response to the position change of the operating body, which can move the playback position in the content to a playback position corresponding to the text data item displayed on the focused region 610. That is, by scrolling the text list displayed in the text list displaying region 600, a playback position in the content can be sought.

Such a control of the playback state of the content in response to the position change of the operating body will be described in detail in <4. Example of Playback State Control Using Text List>.

As described above, with reference to FIG. 4 and FIG. 5, in the information processing apparatus 10 according to the present embodiment, the picture data contained in the content and the text list corresponding to the content are simultaneously displayed on the display screen 115. In addition, the display of the picture data and the display of the text list are changed together, with the playback of the content. Therefore, the user can understand the details of the content more in terms of context by referring to the display of the text list, and can thereby grasp more intuitively the playback position of the content at that moment.

In addition, in the information processing apparatus 10 according to the present embodiment, the playback state of the content is controlled in response to the position change of the operating body in the text list displayed on the display screen 115. Therefore, the user can control the playback state while understanding the details of the content in terms of context, based on the text list, and thus the control of the playback state is achieved while the demand of the user is respected.

In addition, in the information processing apparatus 10 according to the present embodiment, as described above, the picture data contained in the content and the text list corresponding to the content are displayed simultaneously on the display screen 115. That is, this is equivalent to the playback of the content with the subtitles displayed. Therefore, even if the lines of a character contained in the content are in a language different from the native language of the user, referring to the text list displayed on the display screen makes the meanings of the lines relatively easy to grasp. In addition, using the above-described dictionary function helps the user understand more the lines of the character, enabling the user to enjoy the content in the original language, not with dubbing.

3. Functions and Configuration of Information Processing Apparatus

Figure 6:
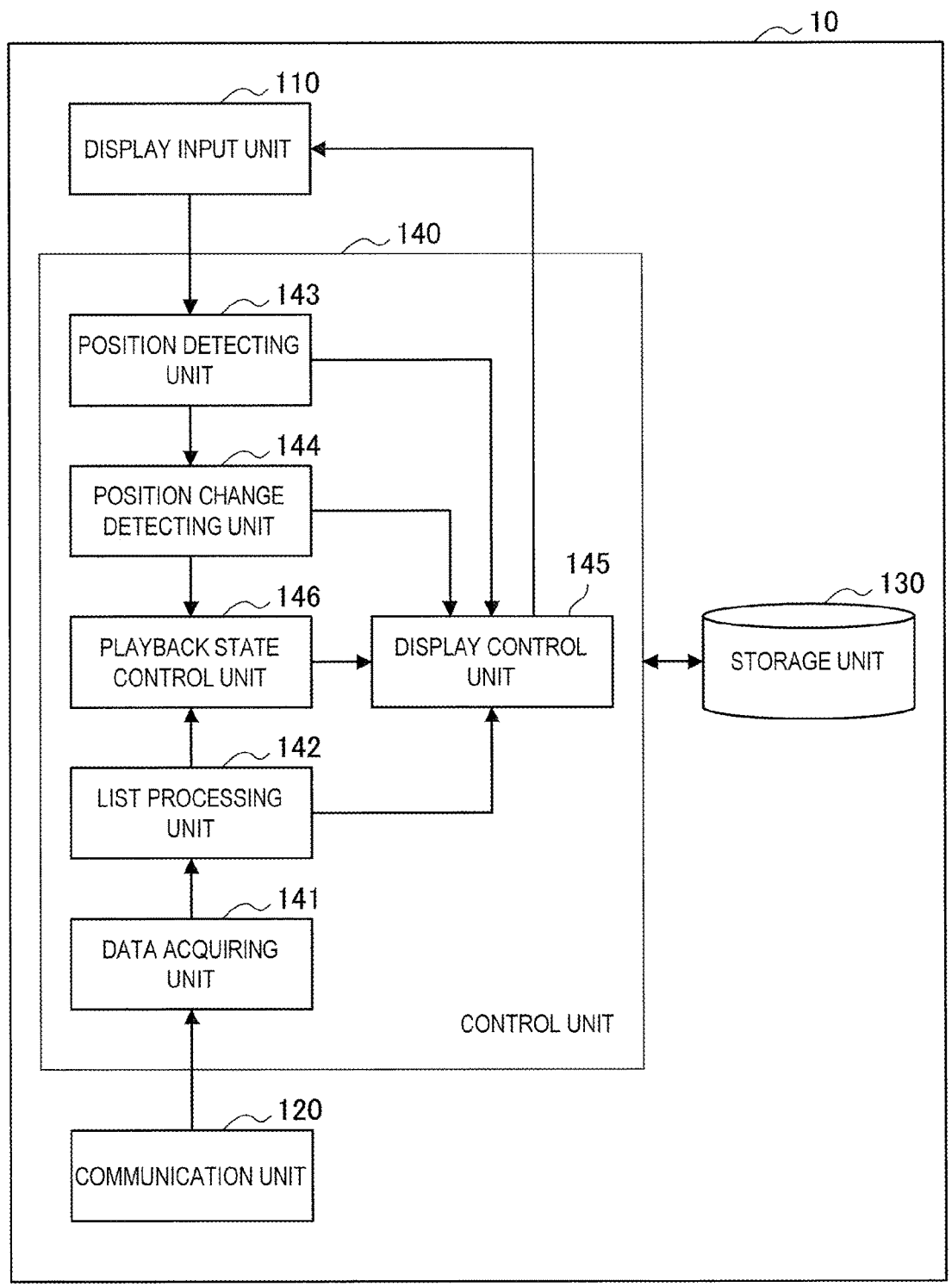
FIG. 6 is a functional block diagram showing functions and the configuration of the information processing apparatus according to the present embodiment.

Next, the functions and the configuration of the information processing apparatus according to the embodiment of the present disclosure will be described in detail with reference to FIG. 6. FIG. 6 is a functional block diagram showing the functions and the configuration of the information processing apparatus according to the present embodiment.

Referring to FIG. 6, the information processing apparatus 10 according to the present embodiment includes a display input unit 110, a communication unit 120, a storage unit 130, and a control unit 140.

The display input unit 110 has both a displaying function of transmitting various kinds of information visually to a user, and an inputting function of allowing the user to input various kinds of information into the information processing apparatus 10. The display input unit 110 may be, for example, a display provided with a touch panel function.

For example, on the display screen of the display input unit 110, the picture data contained in the content may be displayed, and the user can view the content through the display input unit 110. Note that the display screen of the display input unit 110 in FIG. 6 corresponds to the display screen 115 in FIG. 4, as well as in FIG. 7A to FIG. 7C, FIG. 8A to FIG. 8C, FIG. 9A to FIG. 9C, FIG. 10A to FIG. 10C, FIG. 11A to FIG. 11C, and FIG. 13, which will be described hereafter. Furthermore, although not specified in FIG. 6, the information processing apparatus 10 includes an audio output unit that has a configuration of such as speakers for outputting sound (music), and music (piece of music) data contained in a content may be output from the audio output unit.

In addition, the display input unit 110 has a sensing function for detecting a touch of the operating body on the display screen thereof, and can sense the position of the operating body on the display screen. For example, in response to the position of the operating body sensed on the display screen, the information processing apparatus 10 may receive various kinds of information. For example, the display screen of the display input unit 110 displays icons for launching various kinds of software, and upon sensing the position of the operating body on any icon, the information processing apparatus 10 may launch software corresponding to the icon. In the following description, the display screen of the display input unit 110 will be also simply referred to as a "display screen."

The communication unit 120 is a communications interface for connecting the information processing apparatus 10 with various external apparatuses such that they can communicate with each other. The communications system of the communication unit 120 is not especially limited, and various telecommunications standards may be used regardless of whether they are wired or wireless.

For example, the information processing apparatus 10 can receive various kinds of content data via the communication unit 120. In addition, for example, the information processing apparatus 10 can receive text data corresponding to a content via the communication unit 120.

Here, methods of inputting the content data and the text data into the information processing apparatus 10 are not limited to the input methods via the communication unit 120, and any method may be used therefor. For example, although not specified in FIG. 6, the information processing apparatus 10 may include a drive for reading data from various kinds of recording media, and for example, content data and text data recorded in a DVD medium may be input into the information processing apparatus 10 via the drive.

The storage unit 130 has a function of a storage medium for storing various kinds of information. For example, the storage unit 130 can store content data and text data. In addition, for example, the storage unit 130 can store the results of various kinds of processing performed by the control unit 140. The results of various kinds of processing performed by the control unit 140 may be, for example, data such as a text list created by the list processing unit 142, information on the position of the operating body detected by a position detecting unit 143, and information on the position change of the operating body detected by a position change detecting unit 144, all of which will be described hereafter.

Note that the kinds of the storage medium configuring the storage unit 130 are not especially limited, and various known storage media may be used. The storage unit 130 may be configured by, for example, a nonvolatile memory, which is a kind of semiconductor storage devices.

The control unit 140 controls the information processing apparatus 10 in an integrated manner, and has a function of processing various kinds of information input from the display input unit 110 and the communication unit 120, and/or various kinds of information stored in the storage unit 130. The control unit 140 includes a data acquiring unit 141, the list processing unit 142, the position detecting unit 143, the position change detecting unit 144, a display control unit 145, and a playback state control unit 146. The functions of the control unit 140 will be described below in detail.

The data acquiring unit 141 acquires content data and text data. For example, the data acquiring unit 141 can acquire the content data and the text data from the communication unit 120. Here, the text data may be text data items with time stamps, and may be, for example, text data items associated with elapsed times in the playback of a content. That is, the data acquiring unit 141 can acquire the content data and text data that are associated with each other. For example, when the content data is data on a movie, the text data may be data on subtitles corresponding to the movie. The data acquiring unit 141 stores the acquired content data and text data associated with each other in the storage unit 130. In addition, the data acquiring unit 141 transmits the acquired text data to the list processing unit 142.

Note that FIG. 6 shows an example in which the data acquiring unit 141 acquires the content data and the text data from the communication unit 120, both the route through which the data acquiring unit 141 acquires the content data and the text data is not limited to such an example. For example, as described above, in the case where the information processing apparatus 10 includes the drive, the data acquiring unit 141 may acquire the content data and the text data via the drive.

The list processing unit 142 creates a text list based on the text data. The text list is a list in which text data items associated with elapsed times in the playback of a content are sorted in the elapsed time. Note that the text list does not need to include all the text data items relating to the content, but the text list may be created by extracting some of text data items according to a predetermined criterion. Here, the criterion used for extracting the text data items is not especially limited, and may be set by a user as appropriate. For example, in the case where the text data is data on conversations between characters in the content, the text list may be created by extracting only lines of a specified speaker.

In addition, the list processing unit 142 can divide the created text list into a plurality of blocks according to a predetermined criterion. For example, if the interval between text data items reaches a certain period of time, for example, one second, the list processing unit 142 divides the text list between the text data items. In the following description, the blocks of the text list divided by the list processing unit 142 will be also simply referred to as "blocks." Note that the time interval between the text data items to be the criterion used for dividing the text list is not limited to the above example, and may be set as appropriate. For example, to the time interval between the text data items used for the division, an appropriate value may be set based on the average value of time intervals between the text data items contained in the text list.

However, the criterion used for dividing the text list is not limited to such an example, and any other criteria may be employed therefor. For example, in the case where the text data is data on conversations between characters in the content, the list processing unit 142 may identify the speaker and divide the text list based on timings at which the speaker is switched to another. In addition, for example, the list processing unit 142 may analyze the detail of the text data through language recognition processing or the like, and divide the text list upon the detection of a timing at which the context changes. Furthermore, the list processing unit 142 may perform syntactic analysis processing on the detail of text data, and estimate a grammatical separation point to divide the text list. The grammatical separation point may be estimated based on a sign or a character that grammatically represents the start or the end of a sentence, for example, a punctuation mark or a period, or a capital at the beginning of a sentence if the text data is in English. In addition, the text list may be divided by a user's operation at a desired point.

The list processing unit 142 stores the created text list, or the text list after subjected to the segmentation processing into the blocks, in the storage unit 130. In addition, the list processing unit 142 transmits the created text list, or the text list after subjected to the segmentation processing into the blocks to the display control unit 145 and the playback state control unit 146.

The position detecting unit 143 detects the position of the operating body on the display screen of the display input unit 110. Here, the position of the operating body may be expressed in the form of coordinate information based on coordinates that are set on the display screen in advance. In the following description, the information on the position of the operating body detected by the position detecting unit 143 will be referred to as position information on the operating body.

The position detecting unit 143 transmits the position information on the detected operating body to the position change detecting unit 144 and the display control unit 145. In addition, the position detecting unit 143 may store the position information on the detected operating body in the storage unit 130.

The position change detecting unit 144 detects the position change of the operating body on the display screen of the display input unit 110, that is, whether or not the position of the operating body changes, based on the position information detected by the position detecting unit 143. In the following description, information on the position change of the operating body that is detected by the position change detecting unit 144 will be referred to as the position change information on the operating body.

Here, the position change of the operating body in the present embodiment may include a continuous position change of the operating body and a non-continuous position change of the operating body. The term "continuous" implies a state of temporal continuity, a state of spatial (positional on the display screen) continuity, or both of them. That is, the continuous position change of the operating body may be a series of operations by the operating body that is performed in a state that the position of the operating body keeps being temporarily and/or spatially detected.

More specifically, the non-continuous position change of the operating body includes, for example, a so-called tap motion in which the position of the operating body is detected at a location on the display screen in a very short time and becomes not detected immediately.

In contrast, the continuous position change of the operating body includes, for example, a so-called drag (trace) operation in which the position of the operating body continuously moves on the display screen from a first location to a second location, that is, the position of the operating body moves remaining detected. In addition, the continuous position change of the operating body includes, for example, a so-called flick (sweep) operation in which, after detected at the first location, the position of the operating body gradually becomes a non-detected state while moving on the display screen toward any direction. Furthermore, the continuous position change of the operating body includes a so-called hold motion in which the position of the operating body does not move on the display screen remaining detected, that is, keeps being detected at a certain location.

The position change detecting unit 144 transmits the detected the position change information of the operating body to the display control unit 145 and the playback state control unit 146. In addition, the position change detecting unit 144 may store the detected the position change information of the operating body in the storage unit 130.

The display control unit 145 controls the displaying function in the display input unit 110, and causes the display screen of the display input unit 110 to display various kinds of information. More specifically, the display control unit 145 causes the display screen of the display input unit 110 to display at least a part or all of the text list. In addition, the display control unit 145 may cause the display screen of the display input unit 110 to display the picture data contained in the content. For example, the display control unit 145 may display a text list or picture data contained in the content in the text list displaying region 600 and the playback screen display region 500 on the display screen 115 of the display input unit 110, like the example shown in FIG. 4. In addition, when the text list is displayed in the text list displaying region 600 shown in FIG. 4, the display control unit 145 may cause the focused region 610 to display at least one piece of the text data contained in the text list.

In addition, the display control unit 145 can change the display of the text list in response to the continuous position change of the operating body on the text list displayed on the display screen of the display input unit 110. For example, when the continuous position change of the operating body is a drag motion in the list direction of the text list, that is, in the vertical direction in FIG. 4, the display control unit 145 may scroll the text list displayed on the display screen of the display input unit 110 in the list direction.

In addition, when the continuous position change of the operating body is, for example, a drag motion in a direction substantially orthogonal to the list direction of the text list displayed on the display screen of the display input unit 110, that is, in the right or left direction in FIG. 4, the display control unit 145 changes the character spacing of at least one text data item contained in the text list displayed on the display screen. More specifically, the display control unit 145 may change the character spacing of the text data item displayed in the focused region 610 in text list displaying region 600 shown in FIG. 4 according to a drag motion of the operating body in the horizontal direction shown in FIG. 4 on the text list displayed on the display screen.

In addition, when the continuous position change of the operating body is, for example, a so-called hold motion in which the position of the operating body does not change on the text list displayed on the display screen of the display input unit 110, the display control unit 145 may display the text list displayed on the display screen in such a manner as not to scroll the text list.

The playback state control unit 146 controls the playback state of the content. Here, the playback state control of the content is to control various operations relating to the playback of the content, and includes, for example, controlling operations such as (normal) playback, stop, pause, fast-forward, rewind, high-speed playback, slow-motion playback, and repeat playback of the content. In addition, the playback state control of the content includes controlling relating to the operation of playing back the content from any playback position.

The playback state control unit 146 can control the playback state of the content in response to the continuous position change of the operating body on the text list displayed on the display screen of the display input unit 110. For example, as described above, when the continuous position change of the operating body is a drag motion in the list direction of the text list, that is, in the vertical direction in FIG. 4, the display control unit 145 scrolls the text list displayed on the display screen of the display input unit 110 in the list direction. In addition, for example, the playback state control unit 146 changes the playback position in the content in accordance with the display of the text list changed by the display control unit 145. More specifically, the playback state control unit 146 may change the playback position of the content to a playback position corresponding to the text data item displayed in the focused region 610 of the text list displaying region 600 shown in FIG. 4 in accordance with the display of the text list changed by the display control unit 145.

In addition, for example, when the continuous position change of the operating body is a drag motion in a direction substantially orthogonal to the list direction of the text list displayed on the display screen of the display input unit 110, that is, the right or left direction in FIG. 4, the playback state control unit 146 may change the playback speed of the content. More specifically, the playback state control unit 146 may high-speed playback or slow-motion playback the content in response to the drag motion in a right or left direction in FIG. 4 by the operating body on the text list displayed on the display screen.

In addition, when the continuous position change of the operating body is, for example, the so-called hold motion in which the position of the operating body does not change on the text list displayed on the display screen of the display input unit 110, the playback state control unit 146 may repeat playback some region of the content. More specifically, the playback state control unit 146 may subject a part of the content corresponding to the text data item displayed in the focused region 610 of the text list displaying region 600 to repeat playback in response to the hold motion by the operating body on the text list displayed on the display screen.

The display control of the text list and the playback state control of the content in response to the continuous position change of the operating body that is described above will be described in detail in <4. Example of Playback State Control Using Text List>.

The example of the functions of the information processing apparatus 10 according to the present embodiment, in particular, the example of the functions of the control unit 140 is described above in detail with reference to FIG. 6. The above components may be configured by using general-purpose members or circuits, or may be configured by pieces of hardware specialized in functions of the respective components. In addition, with respect to the control unit 140, all the functions of the components may be served by a central processing unit (CPU) or the like. Therefore, it is possible to change the configuration to be utilized as appropriate in accordance with a technological level at the time of practicing the present embodiment.

As described above with reference to FIG. 6, according to the information processing apparatus 10 according to the present embodiment, the display control unit 145 causes the display screen to display at least a part or all of the text list corresponding to the content. In addition, the position change detecting unit 144 detects the position change of the operating body on the text list displayed on the display screen. Furthermore, the playback state control unit 146 controls the playback state of the content based on the continuous position change of the operating body detected on the text list displayed on the display screen. Therefore, the user can control the playback state of the content by performing the operations on the text list. Therefore, the user can control the playback state while referring to the text list, that is, while understanding the detail of the content in terms of context, and it is thus possible to control the playback state according to the context of the content or the intention in a scene, which enables enhancing the convenience of the user.

In addition, according to the information processing apparatus 10 according to the present embodiment, the display control unit 145 changes the display of the text list on the display screen based on the continuous position change of the operating body detected on the text list displayed on the display screen. The user can intuitively understand that the content is currently in what playback state by referring to the changed display of the text list.

4. Example of Playback State Control Using Text List

Next, an example of the playback state control utilizing a text list in the information processing apparatus 10 according to the present embodiment will be described. Four examples will be described below with reference to FIG. 7A to FIG. 7C, FIG. 8A to FIG. 8C, FIG. 9A to FIG. 9C, FIG. 10A to FIG. 10C, and FIG. 11A to FIG. 11C. Note that, in the following description in FIG. 7A to FIG. 7C, FIG. 8A to FIG. 8C, FIG. 9A to FIG. 9C, FIG. 10A to FIG. 10C, and FIG. 11A to FIG. 11C, it is assumed that the control of various displays including a text list on the display screen 115 is performed by the display control unit 145 shown in FIG. 6, and the control of the playback state is performed by the playback state control unit 146 shown in FIG. 6, unless otherwise specified.

In addition, in FIG. 7A to FIG. 7C, FIG. 8A to FIG. 8C, FIG. 9A to FIG. 9C, FIG. 10A to FIG. 10C, and FIG. 11A to FIG. 11C, components having functional configurations substantially identical to those of the information processing apparatus 10 shown in FIG. 1 will be denoted by the same reference numerals, and will not be described in further detail. In addition, in FIG. 7A to FIG. 7C, FIG. 8A to FIG. 8C, FIG. 9A to FIG. 9C, FIG. 10A to FIG. 10C, and FIG. 11A to FIG. 11C, the description will be made assuming the case where the operating body is a finger.

[4.1. Seeking Playback Position]

First, the seek control of a playback position will be described with reference to FIG. 7A to FIG. 7C and FIG. 8A to FIG. 8C. FIG. 7A to FIG. 7C and FIG. 8A to FIG. 8C are explanatory diagrams for illustrating the seek control of a playback position utilizing a text list.

Figure 7A:
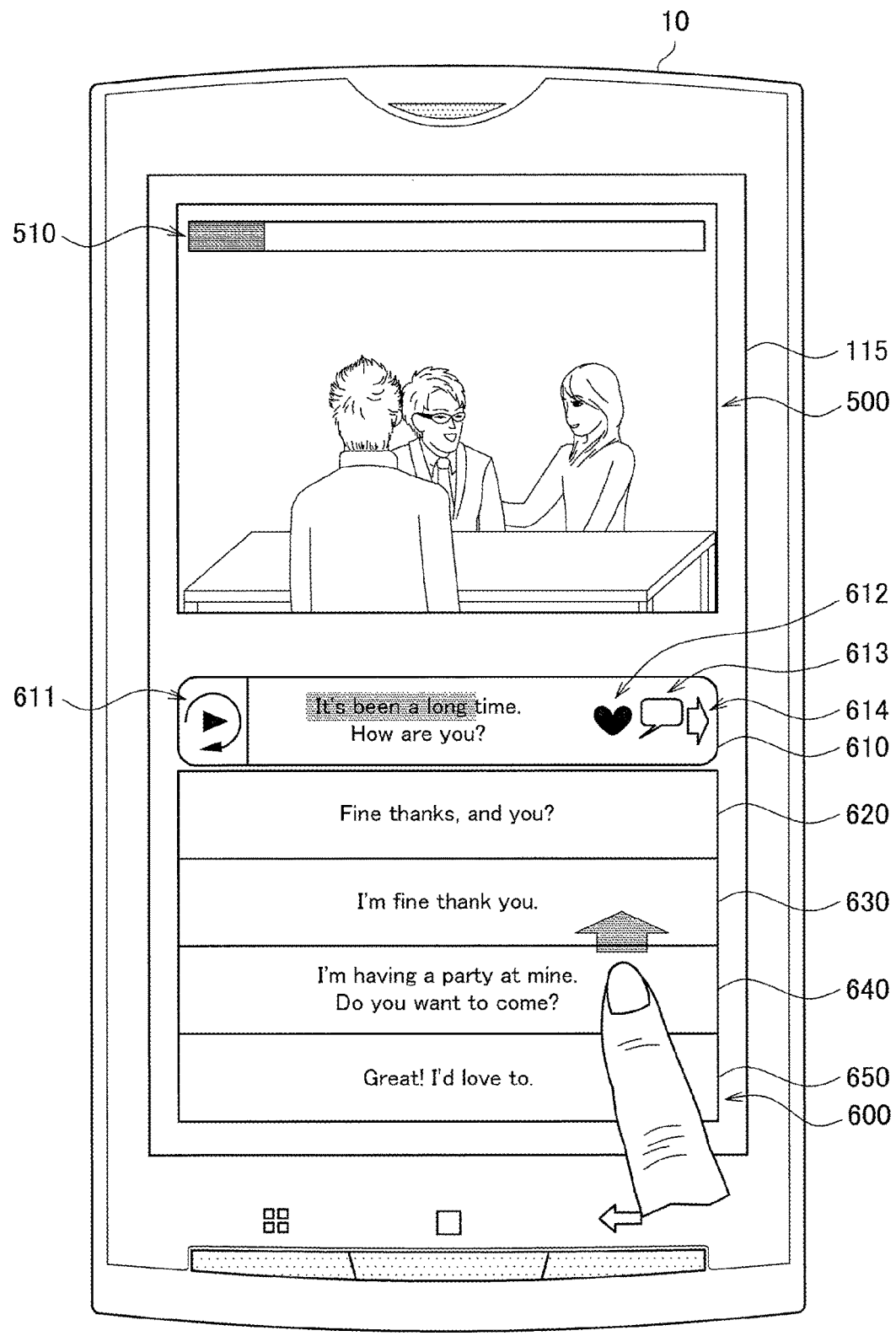
FIG. 7A is an explanatory diagram for illustrating seek control of a playback position utilizing a text list.

Referring to FIG. 7A, the picture data contained in the content is displayed on the playback screen display region 500, and five text data items being a part of the text list are displayed on the text list displaying region 600. As described in <2. Outline of Operating Method>, the text data items displayed on the focused region 610 correspond to the picture displayed in playback screen display region 500 at that moment. In the example shown in FIG. 7A, in picture data displayed in the playback screen display region 500, a line spoken by a character is displayed in the focused region 610.

Figure 7B:
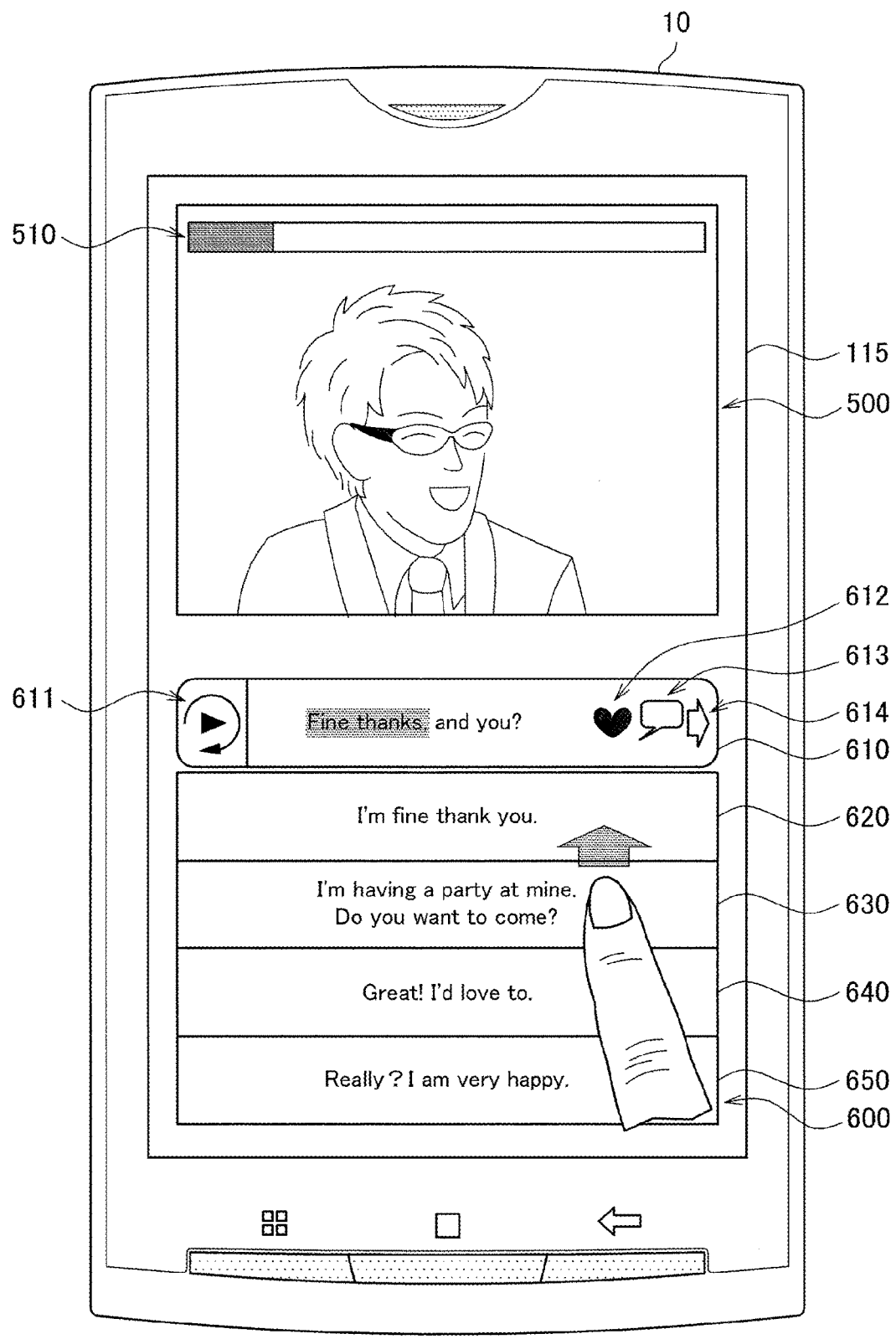
FIG. 7B is an explanatory diagram for illustrating seek control of a playback position utilizing a text list.

Here, as shown by an arrow in FIG. 7A, one finger (operating body) moves in the forward direction of the text list, that is, in the upward direction in FIG. 7A while touching some region of the text list displaying region 600. Then, as shown in FIG. 7B, the text list is displayed being scrolled in the forward direction. That is, the text list displayed in the text list displaying region 600 shifts one by one, and a text data item displayed in the second text displaying region 620 in FIG. 7A is displayed in the focused region 610 in FIG. 7B. Then, the playback position in the content is changed to a playback position corresponding to the text data item displayed in the focused region 610 in FIG. 7B. With the change in the playback position, the display of the playback screen display region 500 including the indicator 510 is also changed.

Figure 7C:
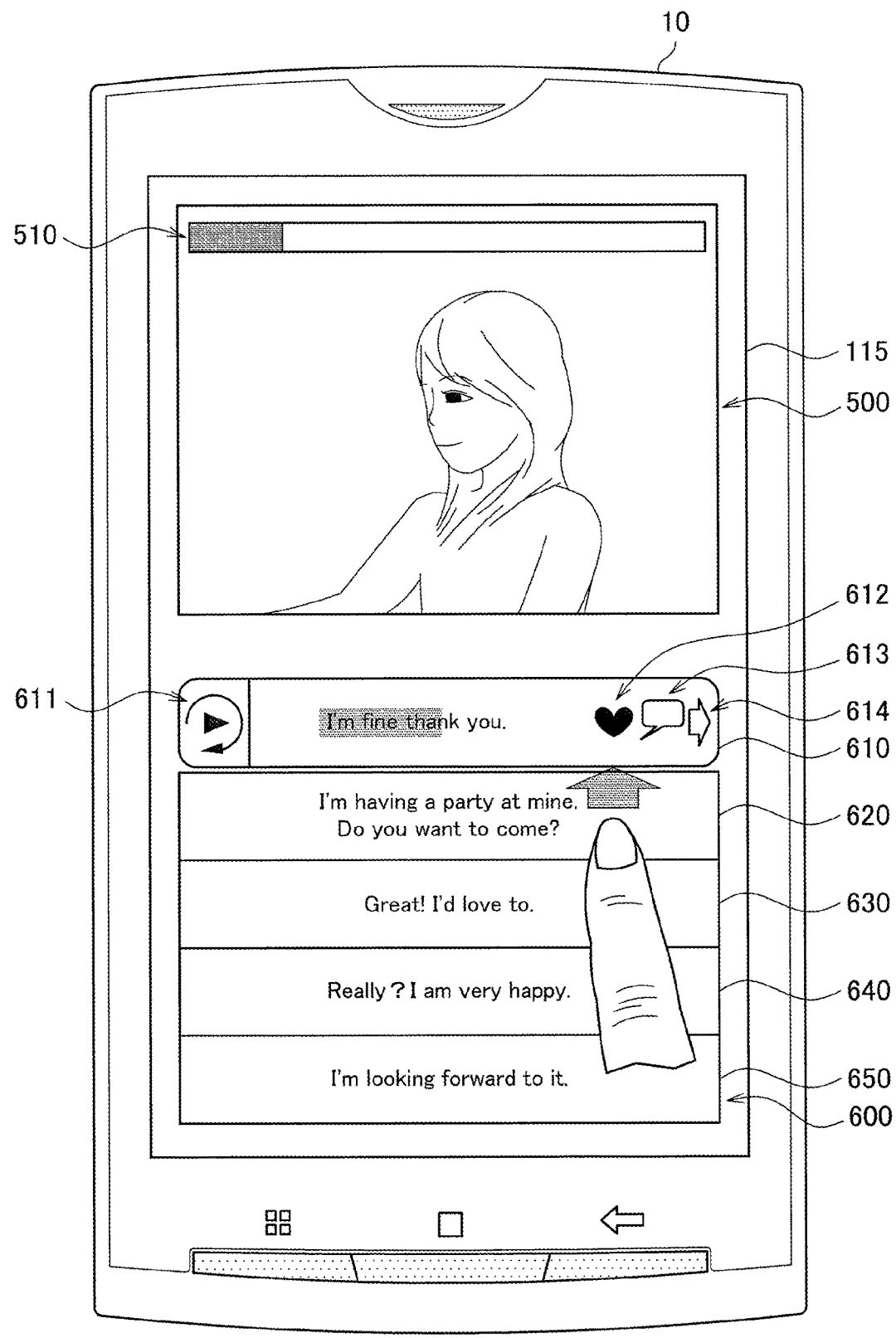
FIG. 7C is an explanatory diagram for illustrating seek control of a playback position utilizing a text list.

FIG. 7C shows a state that the finger further moves in the direction of the arrow in the drawing, that is, in the forward direction of the text list, from the state shown in FIG. 7B. As with the shift from the state shown in FIG. 7A to the state shown in FIG. 7B, the text list is scrolled in the forward direction, and the text data item displayed in second text displaying region 620 in FIG. 7B is displayed in the focused region 610 in FIG. 7C. Then, the playback position in the content is changed to a playback position corresponding to the text data item displayed in the focused region 610 in FIG. 7C. With the change in the playback position, the display of the playback screen display region 500 including the indicator 510 is also changed.

The series of the operations of the finger shown in FIG. 7A to FIG. 7C is an example of the continuous position change of the operating body, which corresponds to the drag motion in the forward direction out of the list directions of the text list. That is, in the information processing apparatus 10 according to the present embodiment, the text list in the text list displaying region 600 is scrolled and displayed in response to the drag motion by the operating body in the forward direction of the text list displayed in the text list displaying region 600, and the playback position in the content is changed to the playback position corresponding to the text data item displayed in the focused region 610, as well. Therefore, the drag motion by the operating body in the forward direction of the text list displayed in the text list displaying region 600 allows for seeking the playback position in the content in the units of text data items.

Note that, in the example shown in FIG. 7A to FIG. 7C, the case where the operating body moves in the forward direction of the text list, and the playback state may be controlled by the operating body moving in the reverse direction of the text list. For example, in response to the drag motion by the operating body in the reverse direction of the text list displayed in the text list displaying region 600, the text list displayed in the text list displaying region 600 may be scrolled in a direction reverse to the direction in the example shown in FIG. 7A to FIG. 7C. Therefore, the user can seek the playback position in both the forward direction of the text list and the reverse direction.

Furthermore, in the seek control of a playback position according to the present embodiment, it is possible to perform different kinds of seek controls of a playback position in accordance with the number of fingers in dragging the operating body or the operating bodies in the list direction of the text list, that is, the number of operating bodies detected on the display screen 115. Such an example will be shown in FIG. 8A to FIG. 8C.

Figure 8A:
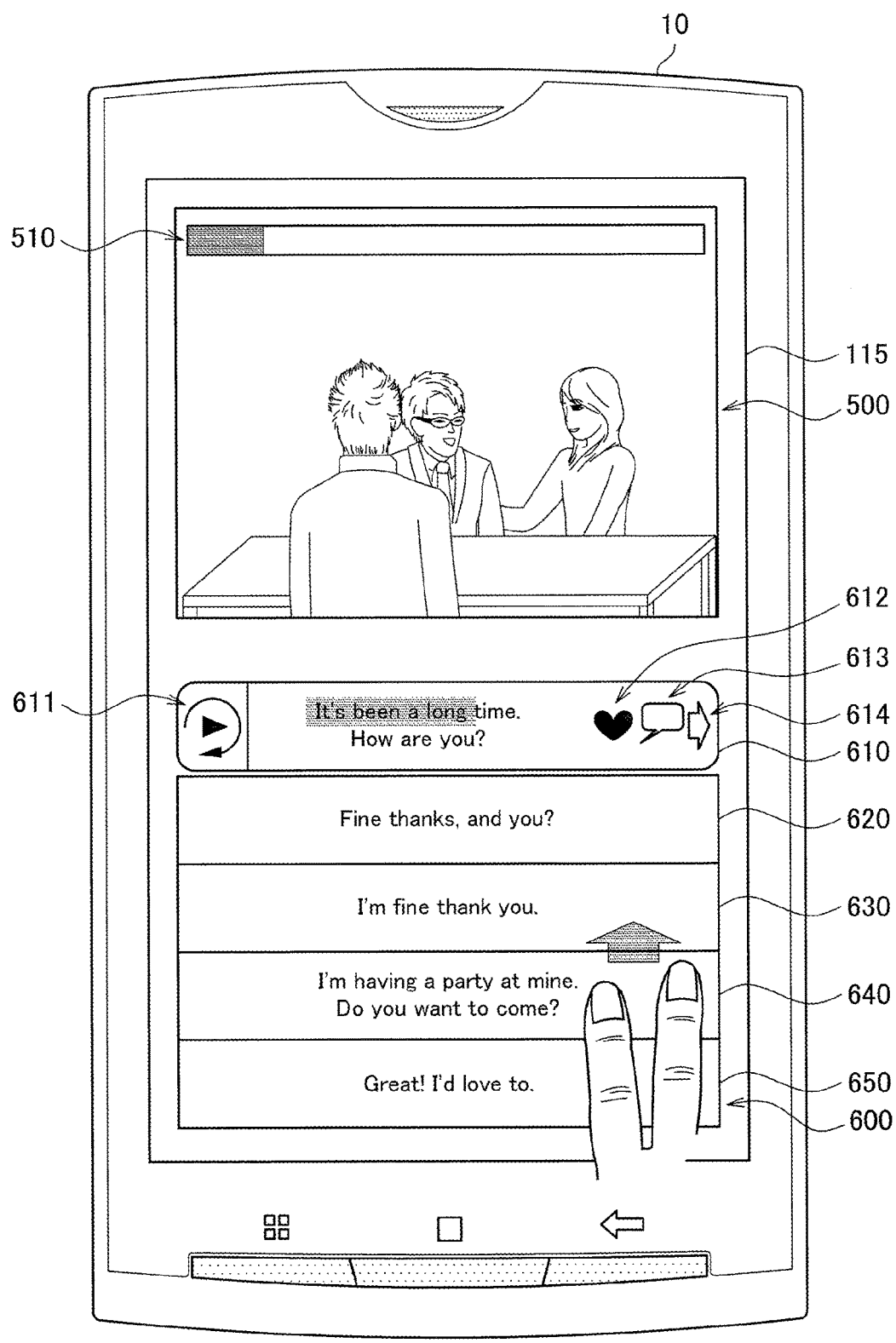
FIG. 8A is an explanatory diagram for illustrating seek control of a playback position utilizing a text list.
Figure 8B:
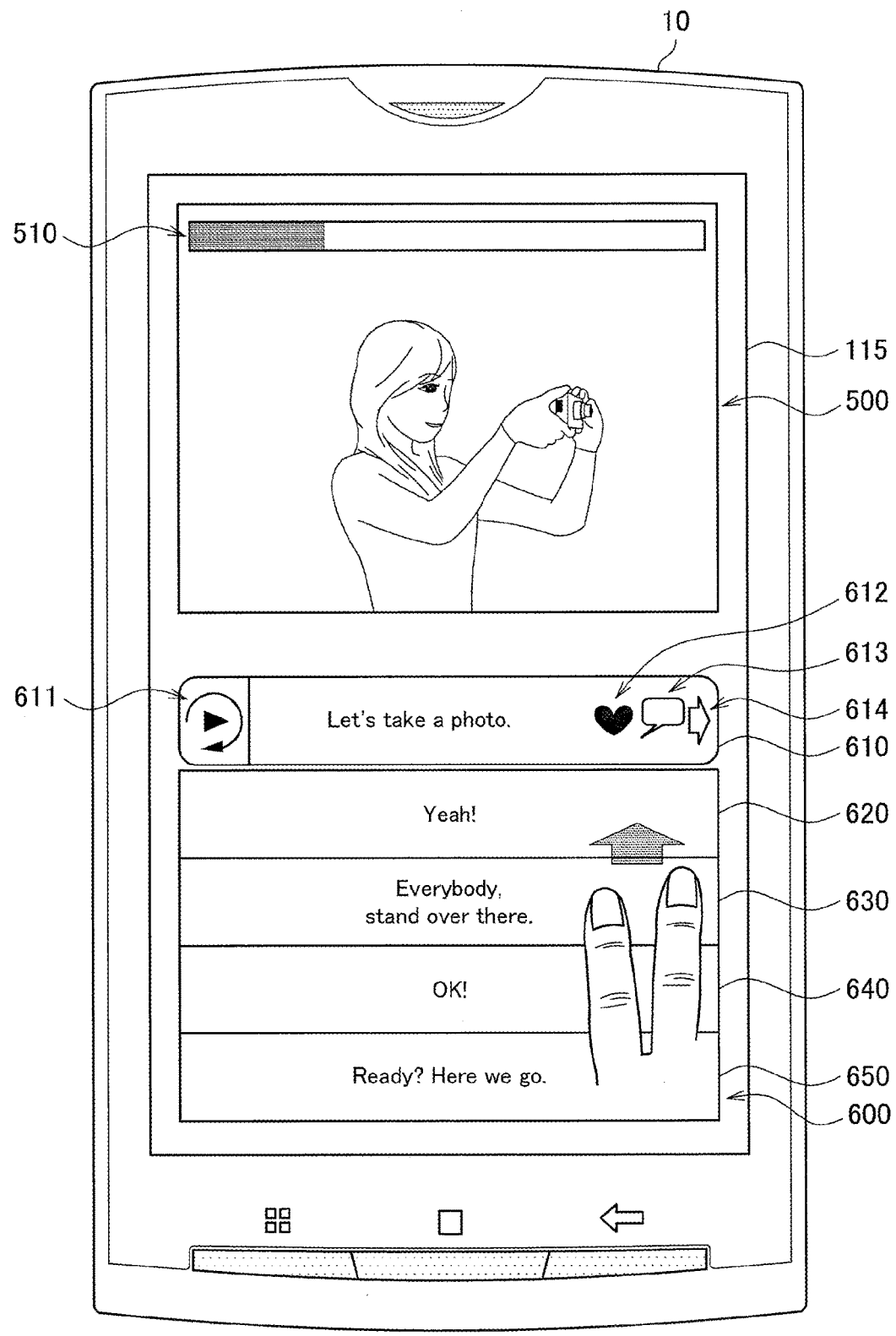
FIG. 8B is an explanatory diagram for illustrating seek control of a playback position utilizing a text list.
Figure 8C:
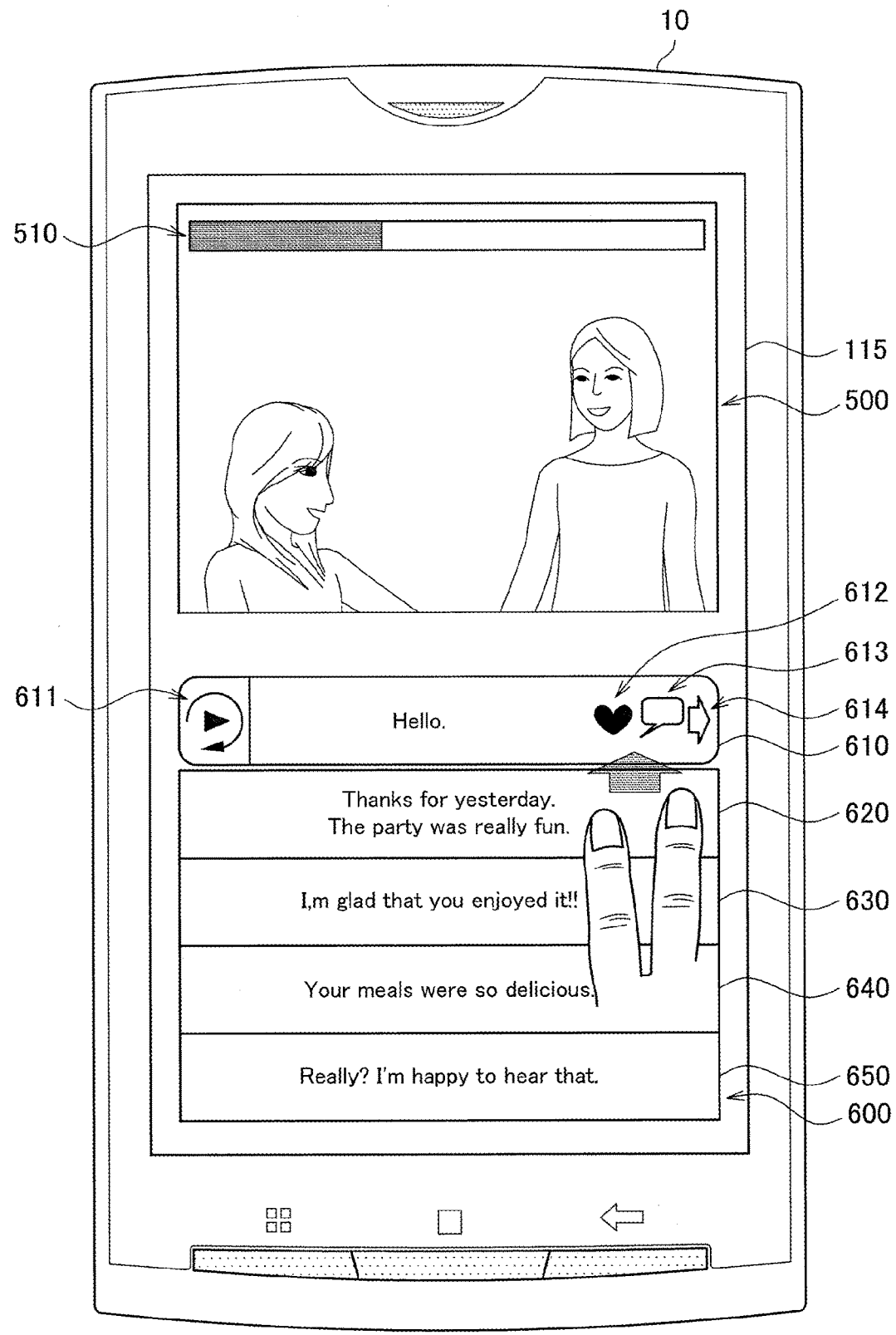
FIG. 8C is an explanatory diagram for illustrating seek control of a playback position utilizing a text list.

In an example shown in FIG. 8A to FIG. 8C, unlike the example in FIG. 7A to FIG. 7C, a drag motion is performed with two fingers. The determination of whether the number of fingers is one or two can be made based on how many locations on the display screen 115 the positions of the operating bodies are detected in the detection of the positions of the operating bodies by the position detecting unit 143.

In the seek control of a playback position according to the present embodiment, performing the drag motion with two fingers allows a user to seek the playback position in the units of blocks of a text list. More specifically, as shown by an arrow in FIG. 8A, two fingers (operating bodies) move in the forward direction of the text list, that is, in the upward direction in FIG. 8A while touching some region of the text list displaying region 600. Then, as shown in FIG. 8B, the text list is scrolled in the forward direction. Note that although the scroll of the text list is performed in the units of text data items in the example shown in FIGS. 7A and B, the scroll of the text list is performed in the units of blocks of the text list in the example shown in FIGS. 8A and B. That is, in FIG. 8B, the display of the text list in the text list displaying region 600 is scrolled up to the beginning of the next block in the order of elapsed times in the text list. Then, in FIG. 8B, the playback position in the content is changed to a playback position corresponding to the text data item displayed in the focused region 610. With the changes in the playback position, the display of the playback screen display region 500 including the indicator 510 is also changed.

FIG. 8C shows a state that the fingers further move in the direction of the arrow in the drawing, that is, in the forward direction of the text list, from the state shown in FIG. 8B. In FIG. 8C, as with the shift from the state shown in FIG. 8A to the state shown in FIG. 8B, the text list is scrolled in the forward direction in the units of blocks, and the display of the text list in the text list displaying region 600 is scrolled up to the beginning of the next block in the order of elapsed times in the text list. Then, in FIG. 8C, the playback position in the content is changed to a playback position corresponding to the text data item displayed in the focused region 610. With the change in the playback position, the display of the playback screen display region 500 including the indicator 510 is also changed.

As described above with reference to FIG. 7A to FIG. 7C and FIG. 8A to FIG. 8C, in the information processing apparatus 10 according to the present embodiment, the user can seek a playback position by causing the operating body or operating bodies, for example a finger or fingers, to perform the drag motion on the text list displayed on the display screen in the, list direction. Since the user can seek the playback position based on the text list, it is possible to perform a seek according to an intention in a context or a scene of the contents, which enables more enhanced convenience of a user.

In addition, the units in which the text list displayed in the text list displaying region 600 is scrolled or the playback position is sought may be changed in accordance with the state of the drag motion. More specifically, changing the number of fingers in performing the drag operation, that is, the number of operating bodies detected on the display screen allows the user to seek the playback position in the units of text data items or blocks. Therefore, the user can seek the playback position according to the circumstances, in such a manner that the user first roughly seeks the playback position in the units of blocks and subsequently finely seeks the playback position in the units of text data items, which further enhances the convenience of the user.

Note that, the above example is described assuming the case where a playback position is sought in the units of text data items when the number of operating bodies detected on the display screen is one, and the playback position is sought in the units of blocks of the text list when the number of operating bodies detected on the display screen is two, but the seek control of the playback position according to the present embodiment is not limited to such an example. The correspondence relationship between the number of operating bodies detected on the display screen and the units in which the playback position is sought is not especially limited, and may be set as appropriate. For example, the playback position may be sought in the units of blocks of the text list when the number of operating bodies detected on the display screen is two or more. In addition, for example, the units in which the text list displayed in the text list displaying region 600 is scrolled, that is, the units in which the playback position is sought is not limited to the units of text data items or blocks, and may be set as appropriate respecting the demands of a user.

[4.2. Repeat Playback]

Figure 9A:
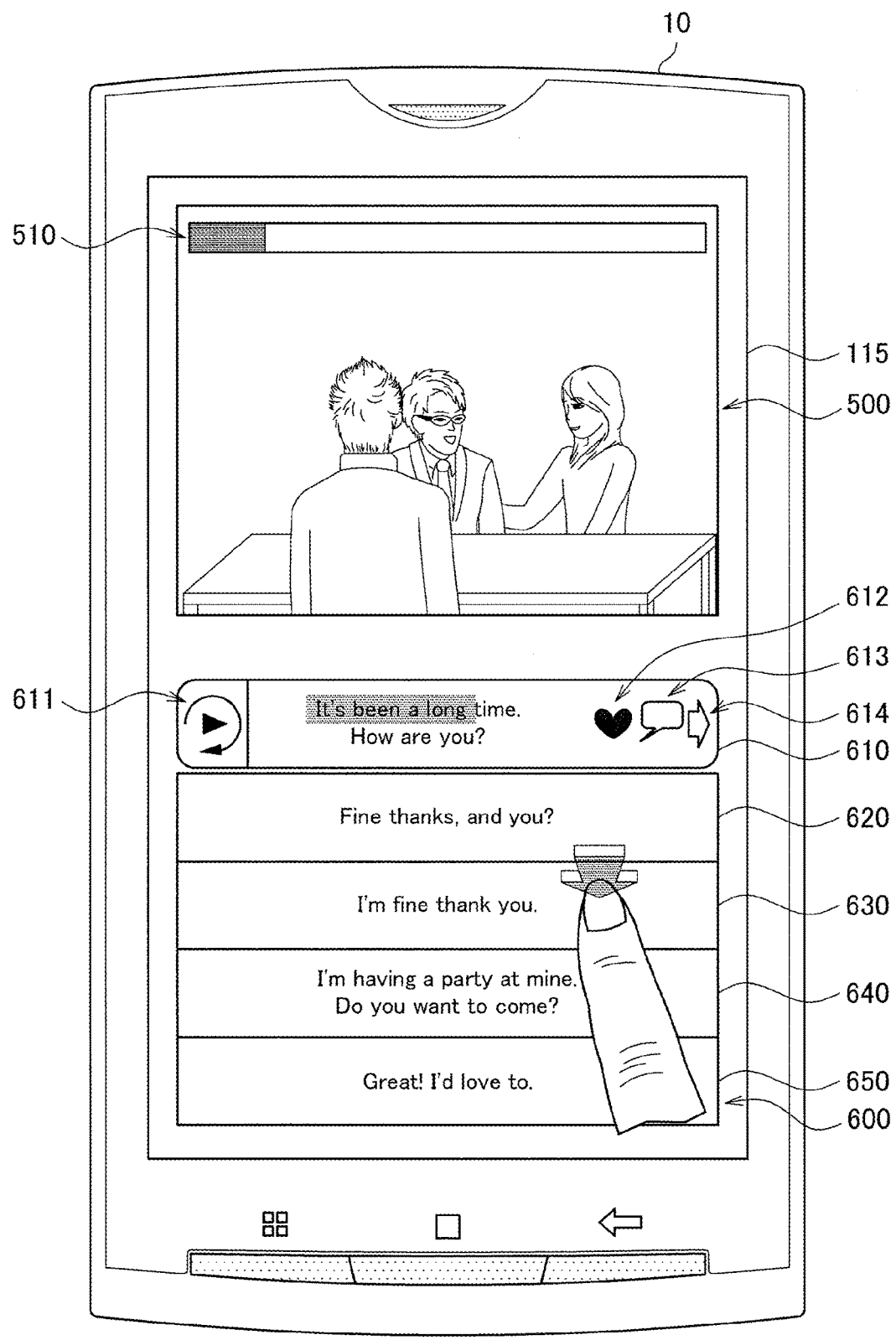
FIG. 9A is an explanatory diagram for illustrating repeat playback control of a content utilizing a text list.
Figure 9B:
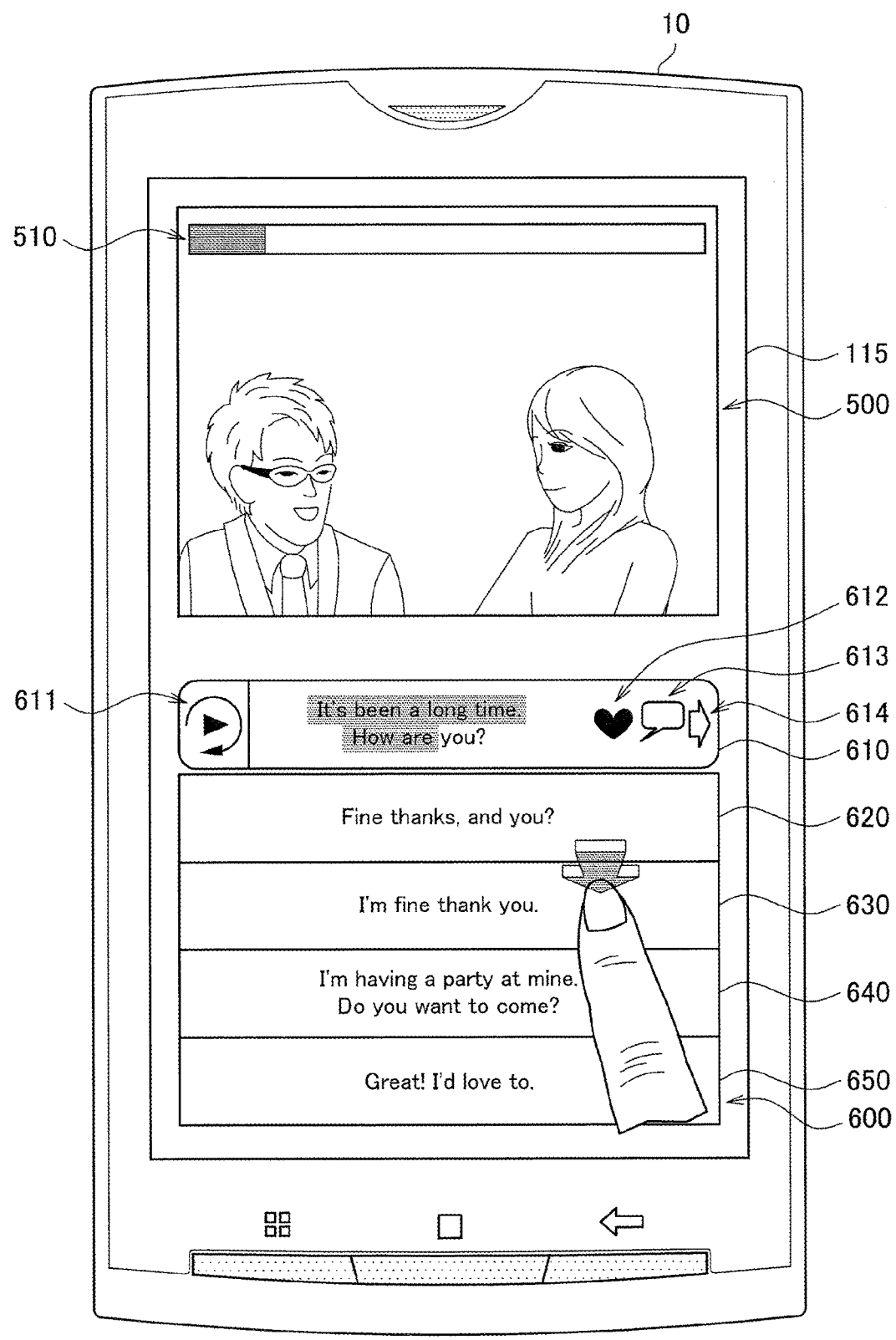
FIG. 9C is an explanatory diagram for illustrating repeat playback control of a content utilizing a text list.

Next, the repeat playback control of a content will be described with reference to FIG. 9A to FIG. 9C. FIG. 9A to FIG. 9C are explanatory diagrams for illustrating the repeat playback control of a content utilizing a text list.

A state shown in FIG. 9A is similar to the states shown in FIG. 7A and FIG. 8A, and will not be described in further detail. Here, as shown by arrows in FIG. 9A to FIG. 9C, a finger is held while touching some region on the text list displayed in the text list displaying region 600. Then, as shown by a shift from the state shown in FIG. 9A to a state shown in FIG. 9B, the playback of a scene corresponding to the text data item displayed in the focused region 610 progresses, but does not progress to the next scene even when the playback of the scene is finished, and as shown in FIG. 9C, the scene corresponding to the text data item displayed in the focused region 610 is played back again from the beginning.

The series of the operations of the finger shown in FIG. 9A to FIG. 9C is an example of the continuous position change of the operating body on the text list displayed in the text list displaying region 600, which corresponds to the hold motion. That is, in the information processing apparatus 10 according to the present embodiment, the content can be subjected to the repeat playback in the units of text data items in response to the hold motion by the operating body on the text list displayed on the display screen 115.

Note that the repeat playback control of a content according to the present embodiment is not limited to such an example, and various modifications may be implemented. For example, in the above example, the content is subjected to the repeat playback in the units of text data items, and the content may be subjected to the repeat playback in the units of blocks of the text list. In addition, a function may be provided in which a user selects any text data item from the text list to separately create the list of text data for repeating (repeat list), and the repeat playback may be performed on the repeat list. Furthermore, a function may be provided in which the user selects a word or words contained in a text data item, and the repeat playback is performed on a selected unit basis.

In addition, when the repeat playback is performed in the units of words, for example, a user selects any text data item displayed in the text list displaying region 600, words contained in the selected text data items may be displayed on the display screen 115 in the form of a list. The user can select a word or words to be subjected to the repeat playback while referring to the displayed list of the words.

In addition, for example, the detail to be played back may be changed every time the repeat playback is repeated. For example, even in the repeat playback for the same text data item, a normal playback is performed at the first time, whereas no sound may be played back at the second time but only a picture may be played back. In addition, a text data item may be displayed in different languages at the first and second times in such a manner that, for example, the text data item is displayed in Japanese in the first playback, and the text data items is displayed in English in the second playback. Note that when the content to play back is changed in accordance with the number of repeat playbacks, the detail of the change may be set by a user as appropriate.

Which repeat playback is to be performed from among the modifications of the repeat playback control as described above may be determined based on, for example, the difference in the hold motions on the text list displayed on the text list displaying region 600. For example, what repeat playback is to be performed may be determined based on the number of fingers in performing the hold motion, the position at which the hold motion is performed, the combination of both, or the like.

As described above with reference to FIG. 9A to FIG. 9C, in the information processing apparatus 10 according to the present embodiment, a user can subject a scene in the content corresponding to the text data item displayed in the focused region 610 to the repeat playback in the units of text data items by causing the operating body, for example a finger, to perform the hold motion on the text list displayed on the display screen. In addition, the units (scope) in which the repeat playback is performed may be changed or a content to be subjected to the repeat playback may be changed according to how to perform the hold motion, for example, the number of fingers in performing the hold motion, the position at which the hold motion is performed, the combination of both, or the like. Therefore, the user can perform the repeat playback based on the text list in a desired mode, which enhances the convenience of the user.

In addition, the repeat playback control according to the present embodiment can be utilized in language learning effectively. For example, in the repeat playback control according to the present embodiment, the repeat playback can be performed in the units of words contained in the text data items, which makes it easy to check the pronunciation of a desired word repeatedly. In addition, in the repeat playback control according to the present embodiment, the content to play back can be changed in accordance with the number of repeat playbacks, and thus by setting the playback such that, for example, a sound and a picture are both played back at the first time and the sound is not played back but only the picture is played back at the second time, the user can practice shadowing at the second playback.

[4.3. High-Speed Playback and Slow Motion Playback]

Figure 10A:
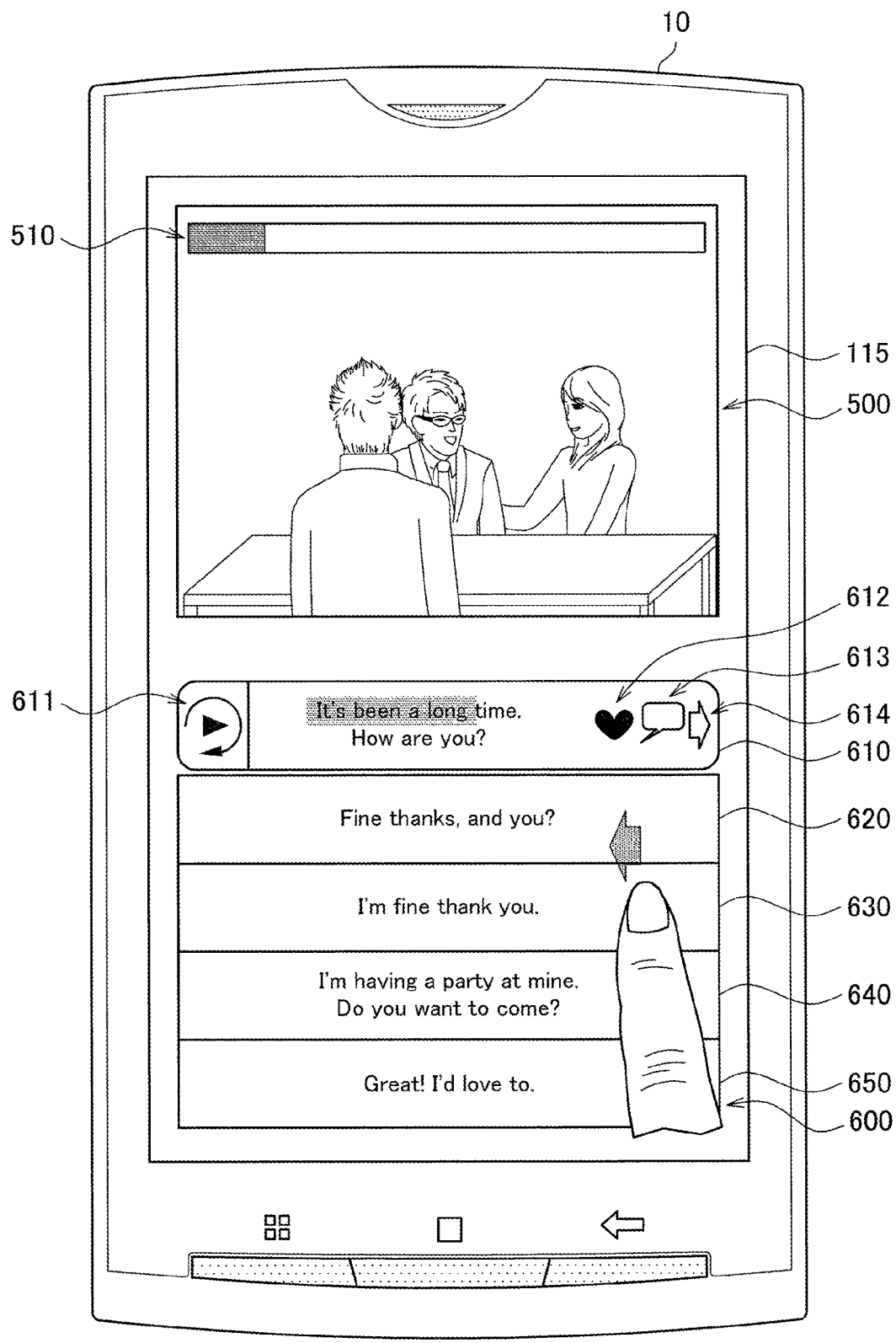
FIG. 10A is an explanatory diagram for illustrating high-speed playback control of a content utilizing a text list.
Figure 10B:
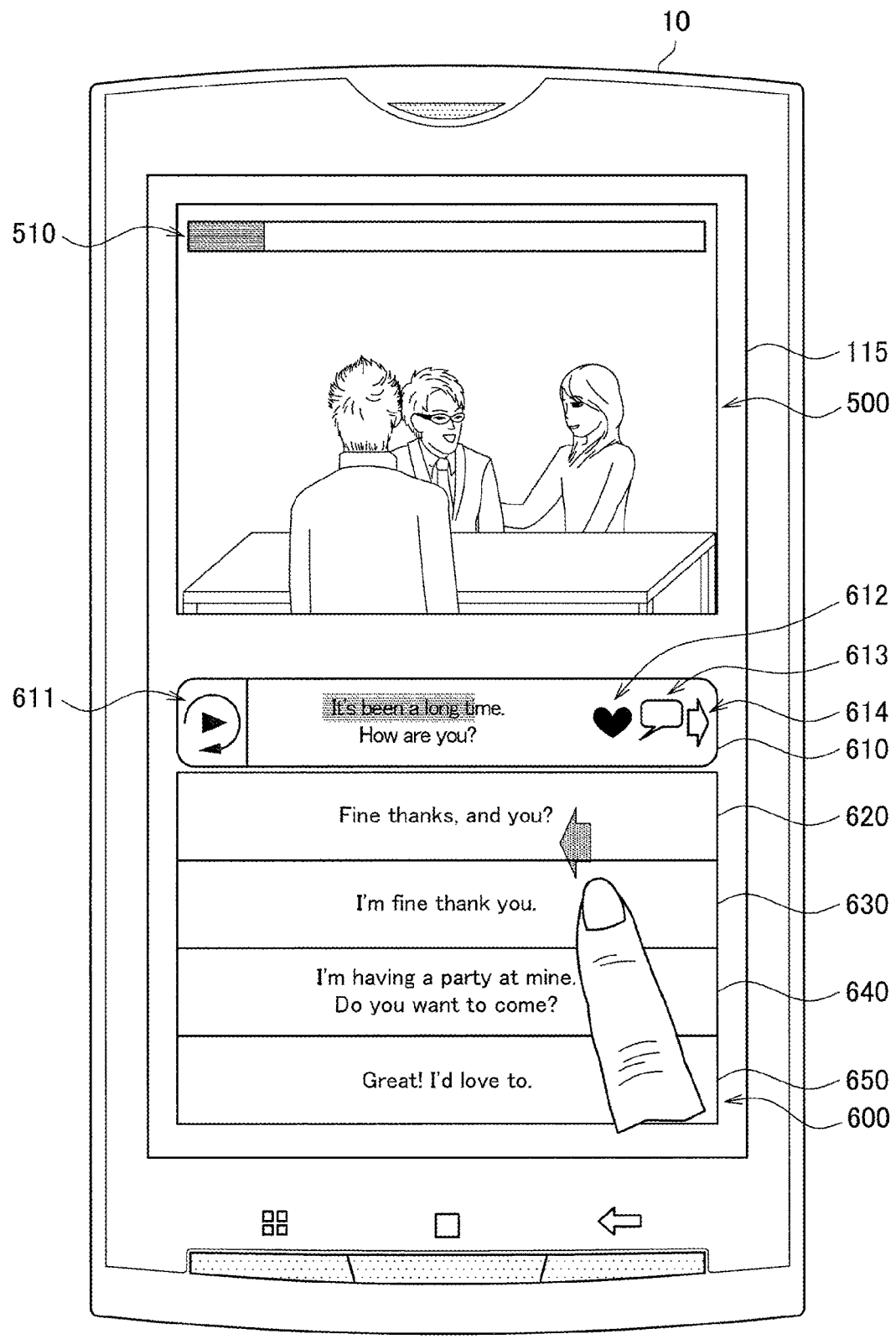
FIG. 10B is an explanatory diagram for illustrating high-speed playback control of a content utilizing a text list.
Figure 10C:
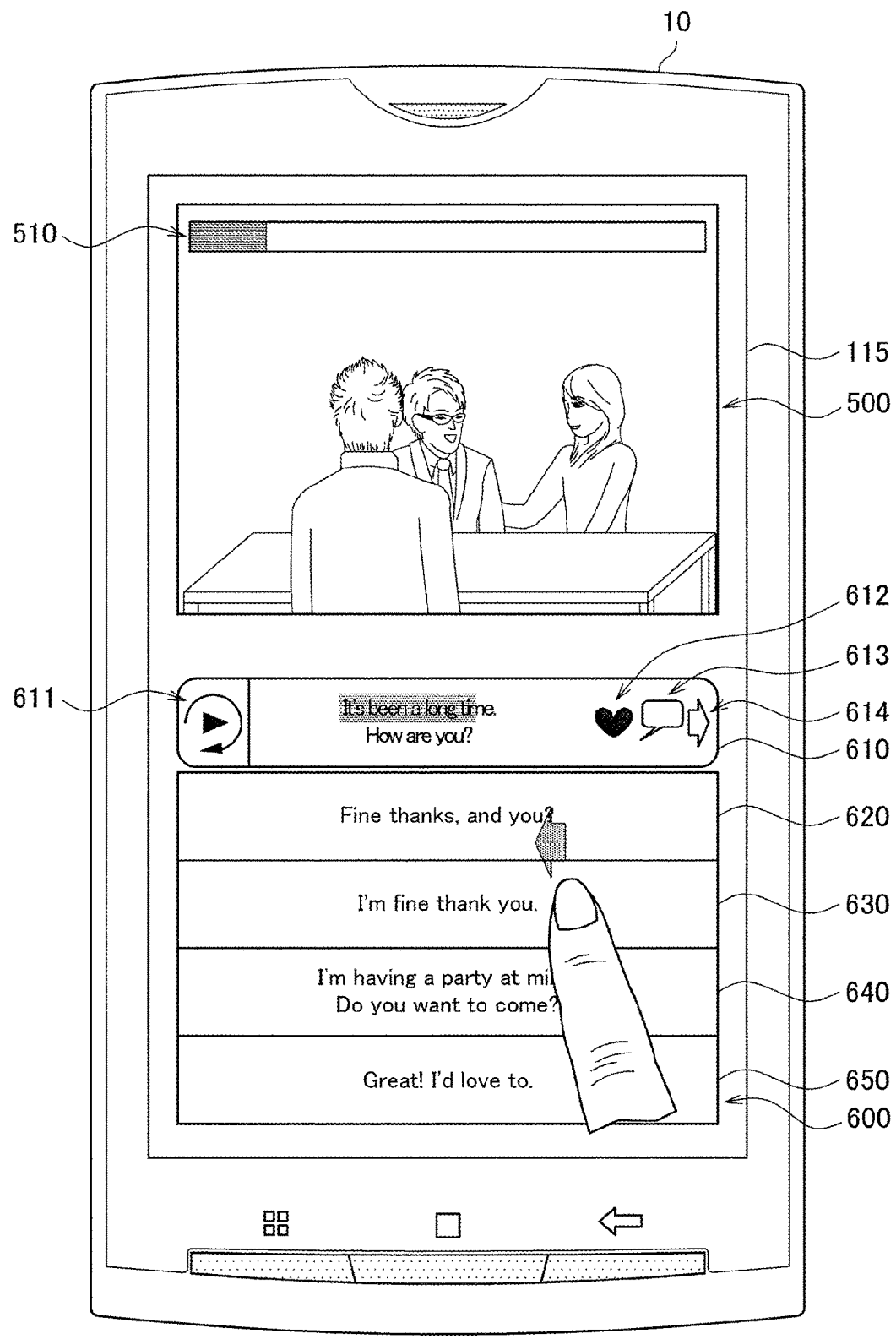
FIG. 10C is an explanatory diagram for illustrating high-speed playback control of a content utilizing a text list.
Figure 11A:
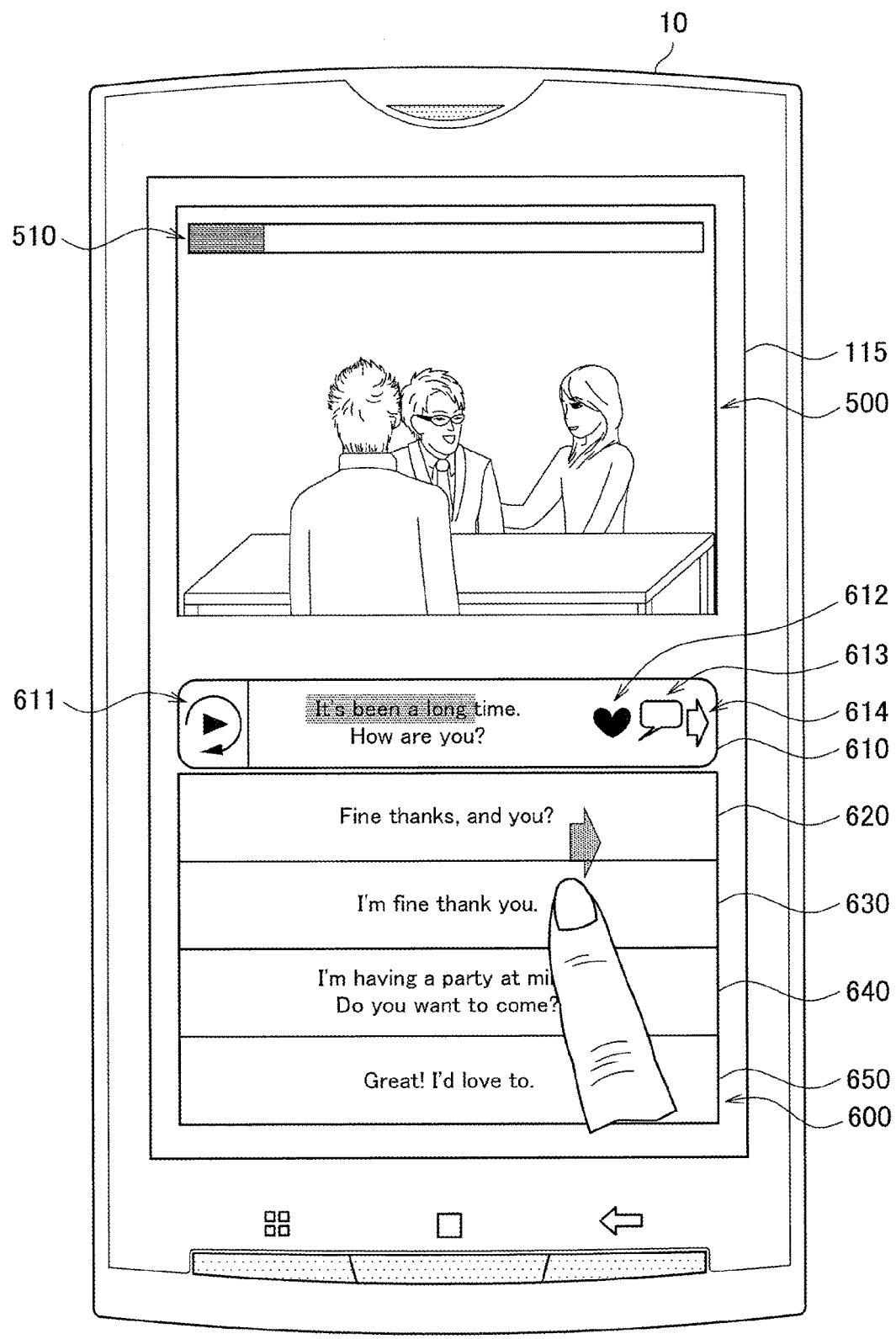
FIG. 11A is an explanatory diagram for illustrating slow motion control of a content utilizing a text list.
Figure 11B:
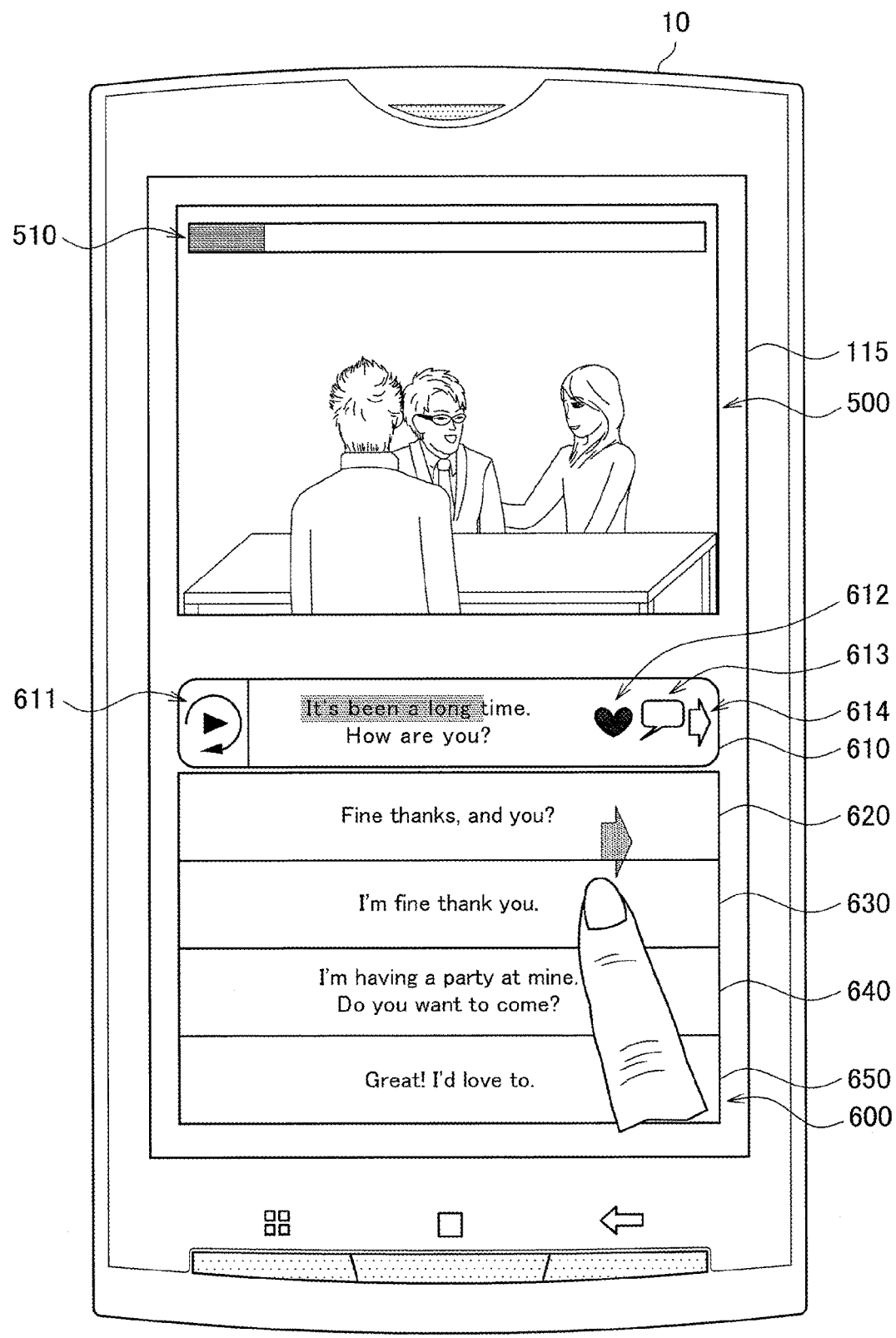
FIG. 11B is an explanatory diagram for illustrating slow motion control of a content utilizing a text list.
Figure 11C:
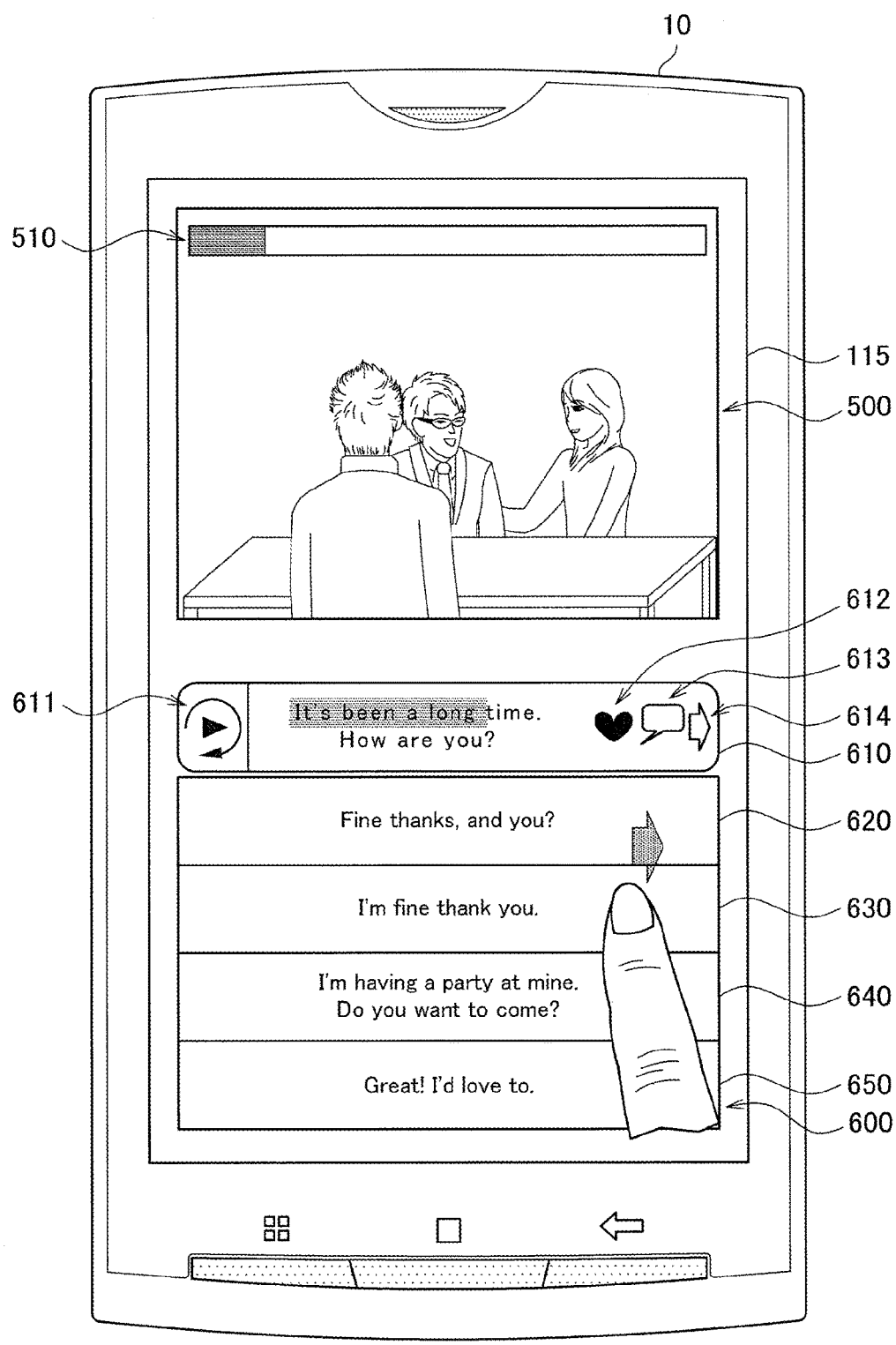
FIG. 11C is an explanatory diagram for illustrating slow motion control of a content utilizing a text list.

Next, the high-speed playback control and the slow motion control of a content will be described with reference to FIG. 10A to FIG. 10C and FIG. 11A to FIG. 11C. FIG. 10A to FIG. 10C are explanatory diagrams for illustrating the high-speed playback control of content utilizing a text list. In addition, FIG. 11A to FIG. 11C are explanatory diagram for illustrating the slow motion control of content utilizing a text list. First, the high-speed playback control of a content will be described with reference to FIG. 10A to FIG. 10C.

A state shown in FIG. 10A is similar to the states shown in FIG. 7A, FIG. 8A, and FIG. 9A, and will not be described in further detail. Here, as show in FIG. 10A, a finger moves in one of directions orthogonal to the list direction of the text list, for example, in a direction indicated by an arrow shown in FIG. 10A to FIG. 10C, that is, a left direction in an example shown in FIG. 10A, while touching on some region on the text list displayed in the text list displaying region 600. Then, as shown in FIG. 10B, the text data displayed in the focused region 610 is displayed with the character spacing (kerning) thereof changed to be reduced. In addition, at the same time as the change in the character spacing, the playback speed of the content is increased.

FIG. 10C shows a state that the finger further moves in a direction indicated by the arrow in FIG. 10A to FIG. 10C, that is, leftward, from the state shown in FIG. 10B. As with the shift from the state shown in FIG. 10A to the state shown in FIG. 10B, the text data displayed in the focused region 610 is displayed with the character spacing further reduced. Then, the playback speed of the content is further increased.

Next, the slow motion control of a content will be described with reference to FIG. 11A to FIG. 11C. In the present example, the slow motion control of a content is performed by a drag motion in the reverse direction with respect to the high-speed playback control of the content.

That is, as shown in FIG. 11A, a finger moves in a direction reverse to that in the case of the high-speed playback control, that is, the other one of directions orthogonal to the list direction of the text list, for example, a direction indicated by an arrow in FIG. 11A to FIG. 11C, that is, in a right direction in an example shown in FIG. 11A, while touching some region in the text list displaying region 600. Then, as shown in FIG. 11B, the text data displayed in the focused region 610 is displayed with the character spacing (kerning) thereof changed to be increased. In addition, at the same time as the change in the character spacing, the playback speed of the content is decreased.

FIG. 11C shows a state that the finger further moves in a direction indicated by the arrow in FIG. 11A to FIG. 11C, that is, rightward, from the state shown in FIG. 11B. As with the shift from the state shown in FIG. 11A to the state shown in FIG. 11B, the text data displayed in the focused region 610 is displayed with the character spacing further increased. Then, the playback speed of the content is further decreased.

The series of the operations of the finger shown in FIG. 10A to FIG. 10C and FIG. 11A to FIG. 11C is an example of the continuous position change of the operating body, which corresponds to the drag motion in a direction orthogonal to the list direction of the text list. That is, in the information processing apparatus 10 according to the present embodiment, the text data displayed in the focused region 610 is displayed with the character spacing changed and the playback speed of the content is changed as well, in response to the drag motion by the operating body in the direction orthogonal to the list direction of the text list displayed on the display screen 115.

Here, in the above example, the description is made assuming the case where the playback speed is increased when the drag motion is performed in the left direction viewed from the user, and the playback speed is decreased when the drag motion is performed in the right direction viewed from the user, but these correspondences may be inverted. Note that the correspondences between the directions of dragging and the increase or decrease of the playback speed is favorably set based on a direction in which characters are input (written) in a language used in the text data. For example, in the case of a language such as English in which characters are input from left to right, a manner in which dragging in the left direction decreases the character spacing and increases the playback speed, meets the intuition of a user. In contrast, for example, in the case of a language such as Arabic in which characters are input from right to left, a manner in which dragging in the right direction decreases the character spacing and increases the playback speed, meets the intuition of the user. Therefore, the correspondences between the direction of dragging and the increase or decrease of the playback speed may be set as appropriate based on the characteristics of a language used in the text data and the sense of the user.

In addition, the degree of the increase or decrease of the playback speed may be, for example, proportional to the distance of dragging in the right or left direction. That is, the playback speed may be controlled in such a manner that the playback speed is further increased or decreased with a longer distance of dragging. Associating the degree of the increase or decrease of the playback speed with the distance of dragging in the right or left direction allows the user to control the playback speed more intuitively.

As described above with reference to FIG. 10A to FIG. 10C and FIG. 11A to FIG. 11C, in the information processing apparatus 10 according to the present embodiment, a user can change the playback speed of the content by causing the operating body, for example a finger, to perform the drag motion on the text list displayed on the display screen in directions orthogonal to the list direction. In addition, with the change in the playback speed of the content, the character spacing of the text data is also changed. For example when the playback speed of the content is increased, the text data is displayed with the character spacing reduced, and when the playback speed of the content is decreased, the text data is displayed with the character spacing increased. Therefore, the user can intuitively grasp whether the content is subjected to the high-speed playback or the slow-motion playback, with the character spacing of the text data.

5. Process Flow in Playback State Controlling Method

Next, an example of a playback state controlling method according to the present embodiment will be described with reference to FIG. 12. FIG. 12 is a flow chart showing an example of a playback state controlling method according to the present embodiment. Note that, in the flow shown in FIG. 12, it is assumed that the information processing apparatus 10 has received content data and text data corresponding to the content, the list processing unit 142 has created a text list. In addition, in the following description of the playback state controlling method, the functions and configurations of the position detecting unit 143, the position change detecting unit 144, the display control unit 145, and the playback state control unit 146 have already been described in <3. Functions and Configuration of Information Processing Apparatus>, and will not be described in further detail. In addition, processes in step S850, step S860, step S880, and step S890 in FIG. 12 are the processing that has been described in <4. Example of Playback State Control Using Text List>, and will not be described in further detail.

First, in step S810, the position detecting unit 143 detects the position of the operating body on the display screen of the display input unit 110.

Next, in step S820, the position change detecting unit 144 detects the position change of the operating body on the display screen of the display input unit 110 based on information on the position of the operating body detected by the position detecting unit 143. Note that the position change of the operating body may be the continuous position change of the operating body on the display screen of the display input unit 110. In addition, the continuous position change of the operating body includes a mode in which the position of the operating body keeps being detected at a certain location on the display screen.

Next, in response to the continuous position change of the operating body on the text list displayed on the display screen of the display input unit 110 detected by the position change detecting unit 144, the display control unit 145 controls the display of the display screen of the display input unit 110, and the playback state control unit 146 controls the playback state of the content. Hereafter, processes of step S830 to S890 in FIG. 12 correspond to playback state control processing by the playback state control unit 146.

More specifically, in step S830, it is determined whether the continuous position change of the operating body is a drag motion in the vertical direction. Here, the drag motion in the vertical direction may be a drag motion by the operating body in the list direction of the text list displayed on the display screen of the display input unit 110. When the continuous position change of the operating body is the drag motion in the vertical direction, the flow proceeds to step S870, or when the continuous position change of the operating body is not the drag motion in the vertical direction, the flow proceeds to step S840.

Next, in step S840, it is determined whether the continuous position change of the operating body is a drag motion in the right or left direction. Here, the drag motion in the right or left direction may be a drag motion by the operating body in a direction orthogonal to the list direction of the text list displayed on the display screen of the display input unit 110. When the continuous position change of the operating body is the drag motion in the right or left direction, the flow proceeds to step S850, or when the continuous position change of the operating body is not the drag motion in the right or left direction, the flow proceeds to step S860.

When the continuous position change of the operating body is not the drag motion in the vertical direction but the drag motion in the right or left direction, the playback state control unit 146 increases or decreases the playback speed of the content in step S850. The process in step S850 corresponds to the processing that has been described in [4.3. High-Speed Playback and Slow Motion Playback], and will not be described in further detail.

When the continuous position change of the operating body is neither the drag motion in the vertical direction nor the drag motion in the right or left direction, the playback state control unit 146 performs the repeat playback on the content in step S860. The process in step S860 corresponds to the processing that has been described in [4.2. Repeat Playback], and will not be described in further detail.

In step S830, when the continuous position change of the operating body is the drag motion in the vertical direction, the number of operating bodies detected by the position detecting unit 143, for example, the number of fingers is determined in step S870.

When the continuous position change of the operating body is the drag motion in the vertical direction and the number of fingers detected by the position detecting unit 143 is one, the playback state control unit 146 moves the playback position in the content in the units of text data items in step S880. In addition, when the continuous position change of the operating body is the drag motion in the vertical direction and the number of fingers detected by the position detecting unit 143 is two or more, the playback state control unit 146 moves the playback position in the content in the units of blocks of the text data in step S890. The processes of step S880 and step S890 correspond to the processing that has been described in [4.1. Seeking Playback Position], and will not be described in further detail.

As described above, in the playback state controlling method according to the present embodiment, a part or all of text list corresponding to a content is displayed on the display screen. In addition, the continuous position change of the operating body on the text list displayed on the display screen is detected. Furthermore, the playback state of the content is controlled based on the continuous position change of the operating body detected on the text list displayed on the display screen. Therefore, the user can control the playback state of the content by performing the operation on the text list. As a result, the user can control the playback state while referring to the text list, that is, while understanding the detail of the content in terms of context, and it is thus possible to control the playback state more according to the context of the content or the intention in a scene, which enhances the convenience of the user.

In addition, with the playback state controlling method according to the present embodiment, the display of the text list on the display screen is changed based on the continuous position change of the operating body detected on the text list displayed on the display screen. Therefore, the user can intuitively understand which playback state the content is currently in by referring to the changed display of the text list.

Not that, in the example shown in FIG. 12, there is described the case where the processes shown in step S830 to S890 are performed, as an example of the playback state control processing, the playback state control processing according to the present embodiment is not limited to such an example. The playback state control processing according to the present embodiment may include various playback state control processing other than the above. For example, the playback state control processing according to the present embodiment may include the various modifications that have been described in <4. Example of Playback State Control Using Text List>. In this case, the number or the arrangement of determination blocks in the flow chart shown in FIG. 12 (e.g., step S830, step S840, and step S870) may be changed as appropriate according to the kinds of the continuous position change of the operating body and the playback state control processing, or the correspondence relationship between the continuous position change of the operating body and playback state control processing.

6. Modification of Playback State Control Utilizing Text List

Next, the modifications of the playback state control utilizing a text list will be described.

[6.1. Utilizing Social Comment]

The descriptions has been thus far made with the example of the case where the content is a video file and the text data is the subtitles corresponding to the video file, but the text list according to the present embodiment is not limited to such an example. The text data according to the present embodiment may be associated with the elapsed time in the playback of the content, and the kind thereof is not limited. For example, the text list may be a so-called social comment.

The social comment refers to a comment, in social media such as a SNS (Social Networking Service) or the like, that is shared among a large number of unspecified users or a plurality of users belonging to the same social medium.

Figure 13:
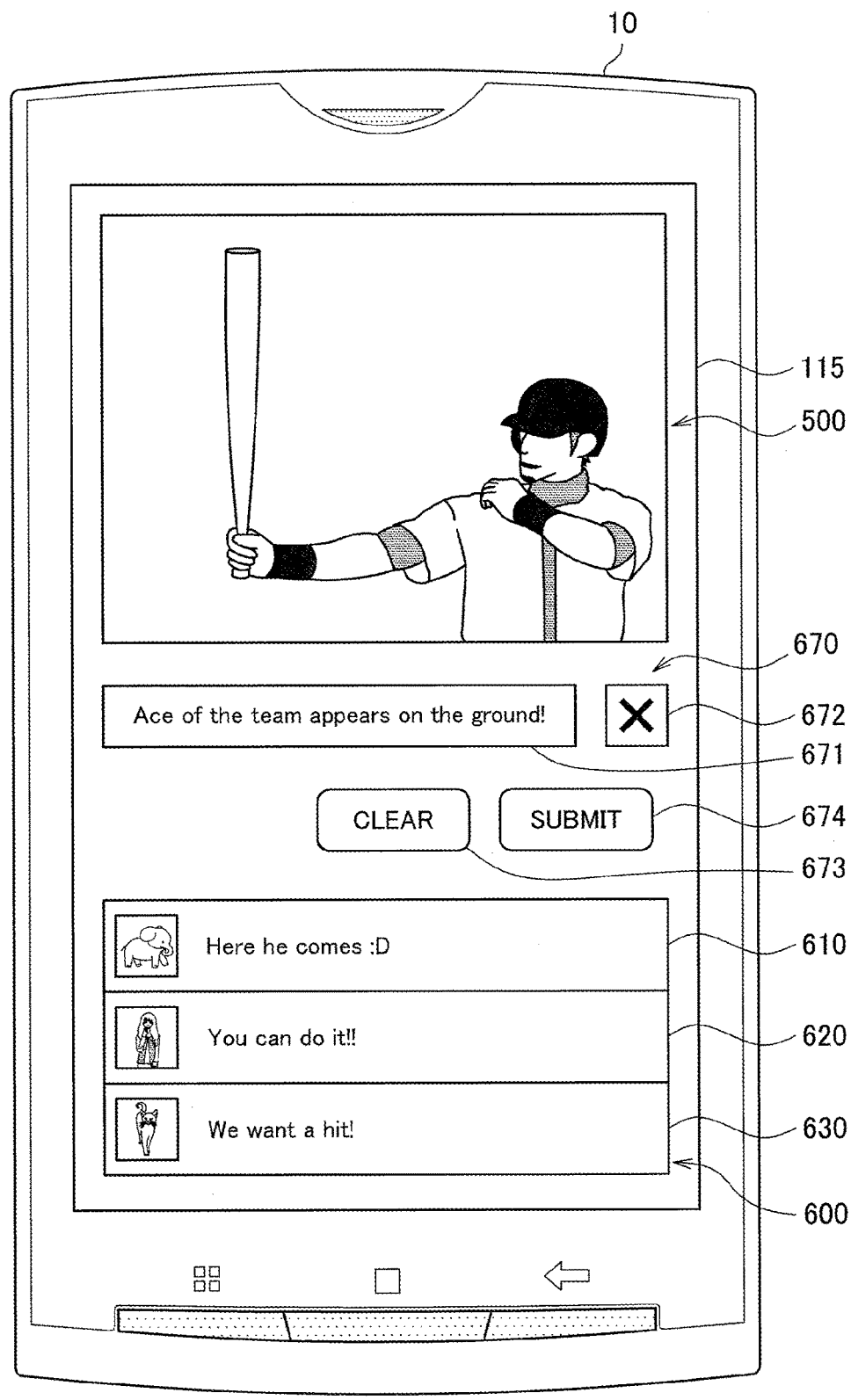
FIG. 13 is a schematic diagram showing an example of a playback state control according to the present embodiment in a case where text data is a social comment.

In the case where the text data is the social comment, for example, a utilizing method shown in FIG. 13 is conceivable. FIG. 13 is an explanatory diagram showing an example of a playback state control according to the present embodiment in a case where text data is a social comment. Note that, in FIG. 13, components having functional configurations substantially identical to those of the information processing apparatus 10 shown in FIG. 4 will be denoted by the same reference numerals, and will not be described in further detail.

In FIG. 13, the content to be an object of the playback state control may be, for example, a video file of a broadcast of sports such as baseball. If the content is a video file of a sports broadcast, for example, a picture of the sports broadcast that is distributed in real time is displayed in the playback screen display region 500. In addition, the information processing apparatus 10 displays the picture of the sports broadcast that is distributed in real time in the playback screen display region 500, while storing (recording) the video file of the sports broadcast in, for example, the storage unit 130 at the same time.

In the text list displaying region 600, social comments that are submitted to the video file of the sports broadcast by a plurality of different users are displayed in the form of list, as the text list. In addition, in the focused region 610, the second text displaying region 620, and the third text displaying region 630, as shown in FIG. 13, icons representing the users who submit the social comments may be displayed in addition to the social comments.

A user can subject the text list to scroll display by causing the operating body (e.g., a finger) to move in the list direction on the text list displayed on the text list displaying region 600. Therefore, the user can browse the text list going back to the past. Then, the playback state control unit 146 can play back the video file of the sports broadcast from a playback position at a time when a social comment displayed in the focused region 610 is submitted from the text list subjected to the scroll display. Therefore, the user can view a desired scene by referring to the past comments to discover a scene to view based on, for example, the detail of the comment and by moving the comment to the focused region 610.

In addition, the user can refer to the number of social comments per unit time when seeking a scene to view. This is because, for example, an exciting scene such as a scoring scene likely has more social comments than the other scenes when the content is the video file of a sports broadcast.

In addition, as shown in FIG. 13, the display screen 115 may be provided with a comment submission region 670 used to submit a comment in real time to a picture displayed in the playback screen display region 500. The comment submission region 670 may be provided with, for example, a comment inputting field 671 to input a comment, a clear button 673 that clears (deletes) the comment input into the comment inputting field 671, and a submitting button 674 that submits the comment input into the comment inputting field 671. The user can input a comment such as an impression and an opinion on the picture displayed in the playback screen display region 500 into the comment inputting field 671, and presses the submitting button 674 to share the comment input into the comment inputting field 671 among a plurality of users including the user himself.

In addition, the comment submission region 670 may be further provided with a close button 672 that hides the comment submission region 670. Pressing the close button 672 may delete the comment submission region 670 from the display screen 115. When the comment submission region 670 is deleted, the text list displaying region 600 may be expanded to a portion where the comment submission region 670 is provided in FIG. 13. If submitting no comment, the user can browse the display of more text data items by deleting the comment submission region 670 to expand the text list displaying region 600.

Note that pressing the close button 672, the clear button 673, and the submitting button 674 in FIG. 13 is performed by the operating body touching regions on the display screen 115 where these buttons are displayed.

As described above with reference to FIG. 13, the text list according to the present embodiment may be social comments. When the text list is social comments, the user can seek the playback position in the content while referring to the details of the social comments or the number of social comments per unit time. Therefore, the user seeks a desired playback position more easily, which enhances the convenience of the user.

[6.2. Hiding Text List]

Figure 14A:
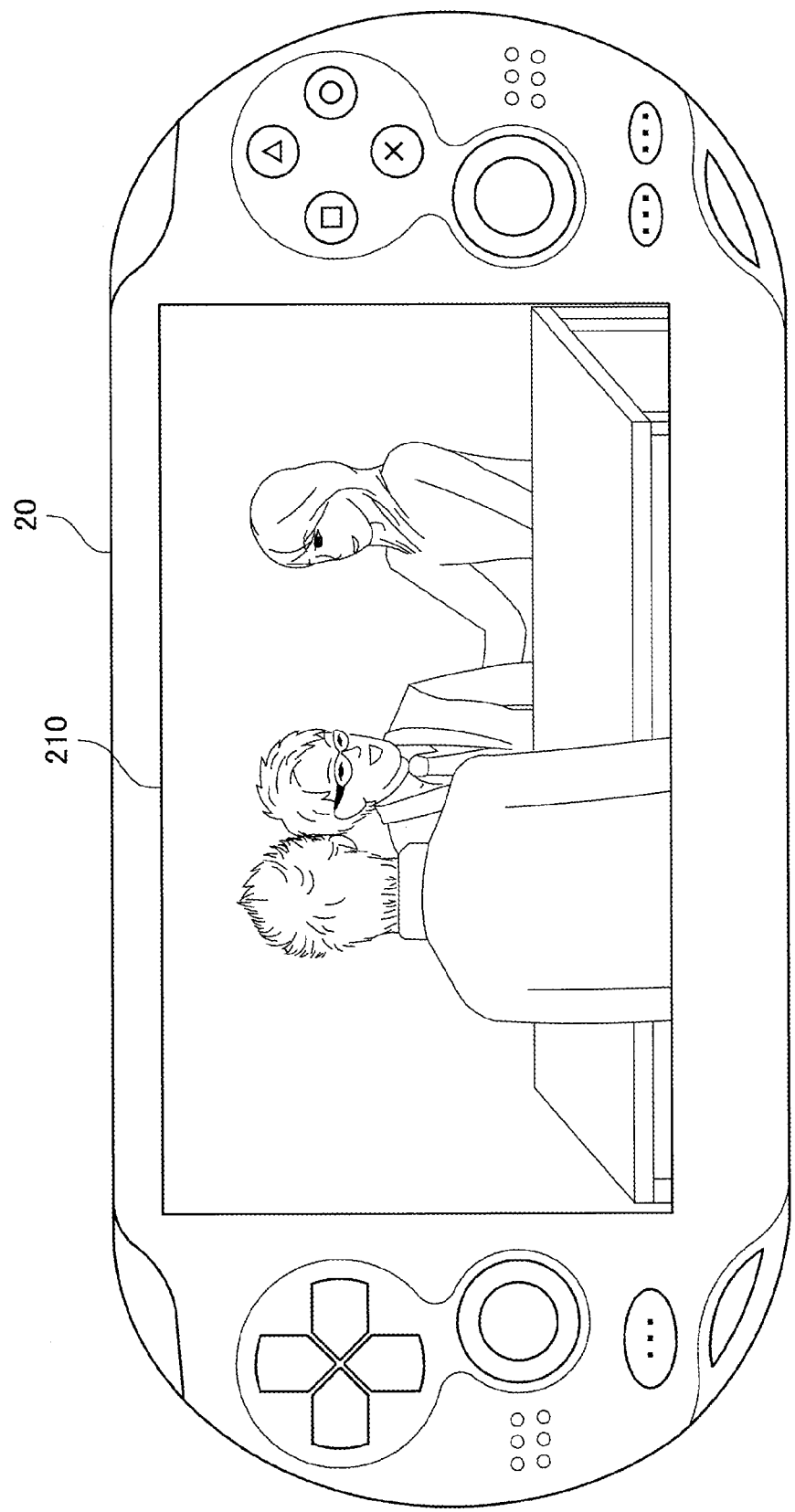
FIG. 14A is a schematic diagram showing an example of playback state control according to the present embodiment in a case where a text list is hidden.

Next, an example in which a text list is hidden will be described with reference to FIGS. 14A and B. FIGS. 14A and B are explanatory diagrams showing an example of playback state control according to the present embodiment in the case where a text list is hidden.

Referring to FIG. 14A, an information processing apparatus 20 according to the present embodiment includes a display screen 210. Note that the functions and the configuration of the information processing apparatus 20 are similar to those of the above-described information processing apparatus 10 except that the information processing apparatus 20 includes the display screen 210 instead of the display screen 115, and thus the description will be made here focusing on only differences from the information processing apparatus 10.

Referring to FIG. 14A, the display screen 210 of the information processing apparatus 20 has a width in a horizontal direction viewed from a user greater than, for example, the display screen 115 of the information processing apparatus 10 shown in FIG. 4. In addition, the display screen 210 is not divided into a playback screen display region and a text list displaying region unlike, for example, the display screen 115 of the information processing apparatus 10 shown in FIG. 4. As shown in FIG. 14A, the display screen 210 displays, for example, only picture data contained in a content and displays no text list.

Figure 14B:
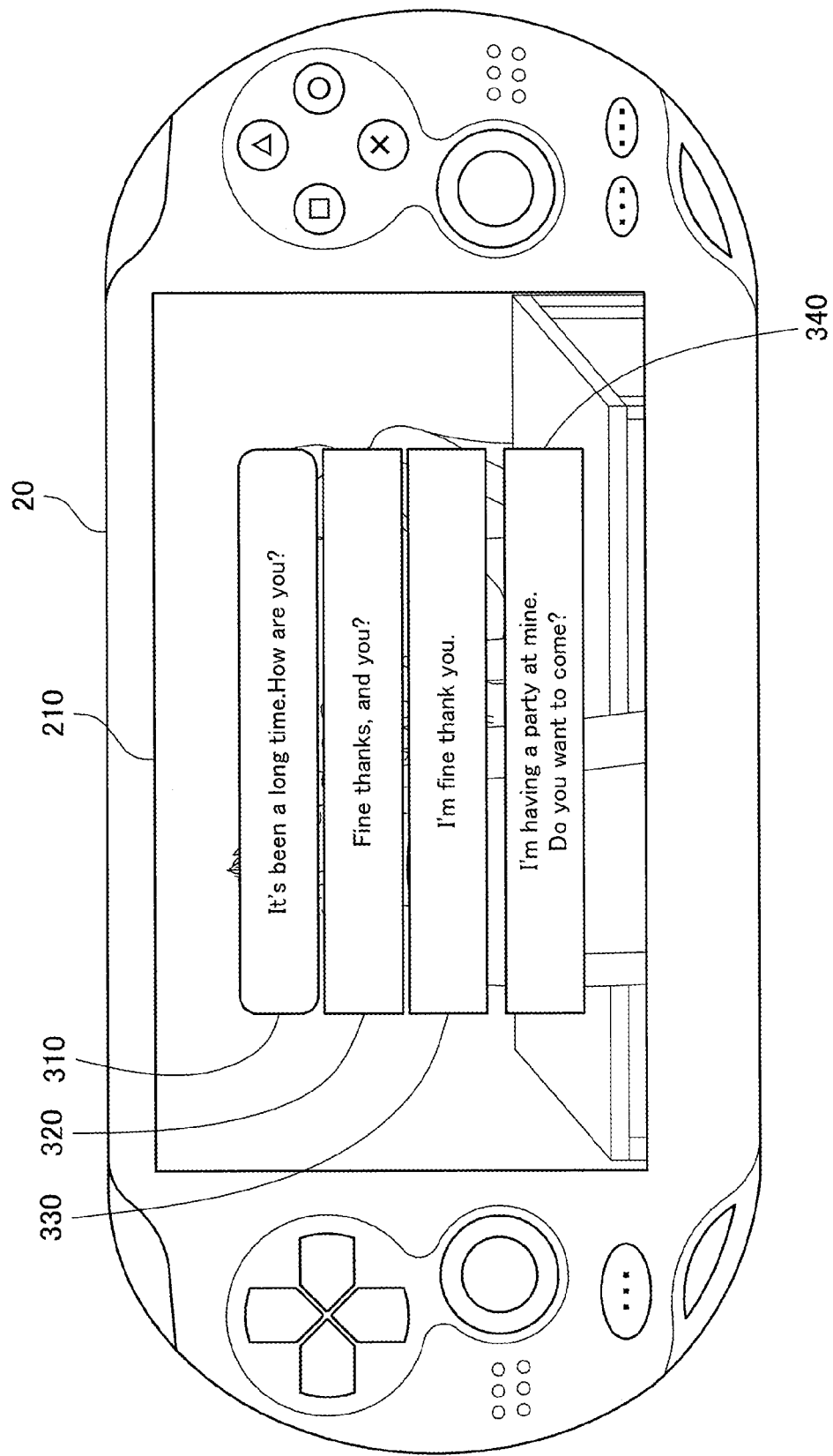
FIG. 14B is a schematic diagram showing an example of playback state control according to the present embodiment in a case where a text list is hidden.

The information processing apparatus 20 displays no text list on the display screen 210 in a normal time as shown in FIG. 14A, and displays a text list on the display screen 210 in response to, for example, the detection of the position of an operating body on the display screen 210. FIG. 14B shows a state that the text list is displayed on the display screen 210.

Referring to FIG. 14B, for example, the picture data contained in the content is displayed on the display screen 210, and a part or all of the text list corresponding to the content is displayed in such a manner as to cover the picture. The display screen 210 includes, for example, a focused region 310, a second text displaying region 320, a third text displaying region 330, and a fourth text displaying region 340, and text data items contained in the text list are displayed one by one in the respective regions. Here, the functions of the focused region 310, the second text displaying region 320, the third text displaying region 330, and the fourth text displaying region 340 are similar to those of the focused region 610, the second text displaying region 620, the third text displaying region 630, and the fourth text displaying region 640 shown in FIG. 4, and will not be described in further detail.

A user causes the operating body to move on the focused region 310, the second text displaying region 320, the third text displaying region 330, and the fourth text displaying region 340 to perform the various playback state controls, as described in <4. Example of Playback State Control Using Text List>.

As described above with reference to FIG. 14, the display screen 210 of the information processing apparatus 20 according to the present embodiment does not always display the text list, and may display the text list on the display screen 210 only when the playback state control is performed. Therefore, for example, even if the display screen 210 has a small size, a sufficiently wide playback screen display region can be secured when the playback state control is not performed, offering a comfortable viewing of a content for a user.

[6.3. Other Modifications]

The other modifications of the playback state control according to the present embodiment utilizing a text list will be described below.

For example, if a plurality of text lists different from one another are present for a content, the kinds of text list displayed on the display screen may be switched by any operation by a user. In addition, the plurality of text lists different from one another may be arranged and displayed on the display screen in parallel simultaneously.

For example, if the content is a video file, subtitle data contained in the video file or social comments that have been described in [6.1. Utilizing Social Comment] may be present as text data corresponding to the content. In addition, even if the text data is the subtitle data, a text list containing all text data items is present whereas, for example, a text list that a user uniquely creates by extracting some text data items may be present, such as the favorite list that has been described in <2. Outline of Operating Method>, or the list for the repeat playback that has been described in [4.2. Repeat Playback]. Furthermore, even if the text data is the subtitle data, for example, text lists configured by text data items in different languages such as English and Japanese may be present.

A user may be allowed to cause a desired text list through a predetermined operation. For example, as described in <2. Outline of Operating Method>, a text list configured by social comments may be inserted on the display screen by utilizing, for example, the comment list inserting icon 614 shown in FIG. 4. In addition, a text list configured by the bookmarked text data (favorite list) may be inserted on the display screen 115 by the operating body dragged in the direction orthogonal to the list direction while touching the bookmark icon 612 shown in FIG. 4. In addition, the displays of a plurality of text lists different from one another may be switched by various operations.

In addition, the above described has been made about the method of controlling the playback state by the continuous position change of the operating body on the text list displayed on the display screen, and the playback state may be controlled by the non-continuous position change of the operating body on the text list displayed on the display screen. The non-continuous position change of the operating body may be, for example, a tap motion. For example, a user taps some text data items on the text list displayed on the display screen to move the tapped text data item to, for example, the focused region 610 shown in FIG. 4, and the playback position in the content may be moved to a playback position corresponding to the tapped text data.

In addition, for example, when a text list is displayed on the display screen, only text data items satisfying a predetermined condition may be displayed from among text data items contained in the text list. For example, in the case where the content is a video file and text data contains text data items on the conversations of characters in the video file, only a text list consisting of lines spoken by a specified person may be displayed on the display screen. That is, the text list can be filtered by speaker.

In addition, when a text list is filtered by speaker, for example, by touching a character included picture data displayed on the display screen, the lines of the touched character may be displayed as a text list. By performing such display of the text list, for example, when a user is concerned about a past line of some character in viewing a content, by touching the character on the screen, a text list configured by past lines of the character is displayed, which allows the user to seek a playback position based on the text list.

7. Hardware Configuration

Next, a hardware configuration of the information processing apparatus 10 according to an embodiment of the present disclosure will be described in detail with reference to FIG. 15. FIG. 15 is a block diagram describing the hardware configuration of the information processing apparatus 10 according to the embodiment of the present disclosure.

The information processing apparatus 10 mainly includes a CPU 901, a ROM 903, and a RAM 905. In addition, the information processing apparatus 10 further includes a host bus 907, a bridge 909, an external bus 911, an interface 913, an input device 915, an output device 917, a storage device 919, a communication device 921, a drive 923, and a connection port 925.

The CPU 901 functions as an arithmetic operation processing device and a control device, and controls all or some of operations performed in the information processing apparatus 10 according to various kinds of programs recorded in the ROM 903, the RAM 905, the storage device 919, and a removable recording medium 929. The CPU 901 corresponds to, for example, the control unit 140 shown in FIG. 6 in the present embodiment. The ROM 903 stores programs that the CPU 901 uses, arithmetic operation parameters, and the like. The RAM 905 primarily stores programs that the CPU 901 uses, parameters that appropriately change in execution of the programs, and the like. They are connected to one another by the host bus 907 configured by an internal bus such as a CPU bus.

The host bus 907 is connected to the external bus 911 such as a PCI (Peripheral Component Interconnect/Interface) bus via the bridge 909. In addition, the imaging device 914, the input device 915, the output device 917, the storage device 919, the communication device 921, the drive 923, and the connection port 925, for example, are connected to the external bus 911 via the interface 913.

The input device 915 is an operation part which users operate, for example, a mouse, a keyboard, a touch panel, a button, a switch, a lever, and the like. The input device 915 in the present embodiment is provided, for example, in the display input unit 110 shown in FIG. 6 as a function of a touch-panel. In addition, the input device 915 may be, for example, a remote controlling part (so-called remote controller) that uses infrared rays or other radio waves, or may be externally connected device 931 such as a mobile telephone or a PDA corresponding to operations of the information processing apparatus 10. Furthermore, the input device 915 is configured as, for example, an input control circuit that generates input signals based on, for example, information input by a user using the operation part described above and outputs the signals to the CPU 901. A user of the information processing apparatus 10 can input various kinds of data or instruct the information processing apparatus 10 on processing operations by operating the input device 915.

The output device 917 is configured as a device that can inform users of acquired information in a visual or auditory manner. As such a device, there are display devices including a CRT display device, a liquid crystal display device, a plasma display device, an EL display device, and a lamp, audio output devices including a speaker, and a headphone, and the like. The output device 917 outputs, for example, results obtained from various kinds of processes performed by the information processing apparatus 10. To be specific, a display device displays results obtained from various kinds of processes performed by the information processing apparatus 10 in the form of text or image. The function of the display device is, in the present embodiment, incorporated in, for example, the display input unit 110 shown in FIG. 6 as a displaying function. In contrast, the audio output device converts audio signals formed by played back sound data, acoustic data, and the like into analog signals and outputs the analog signals. The audio output device corresponds to, in the present embodiment, for example, the audio output unit that has been referred to in <3. Functions and Configuration of Information Processing Apparatus>.

The storage device 919 is a device for data storage configured as an example of a storage unit of the information processing apparatus 10, and corresponds to the storage unit 130 shown in FIG. 6, for example, in the present embodiment. The storage device 919 is configured by, for example, a magnetic storage device such as a hard disk drive (HDD), a semiconductor storage device, an optical storage device, or a magneto-optical storage device. The storage device 919 stores programs executed by the CPU 901, various kinds of data, and content data or text data acquired from outside, and the like.

The communication device 921 is a communication interface configured by a communication device or the like to be connected to, for example, a communication network 927, and corresponds to the communication unit 120 shown in FIG. 6, for example, in the present embodiment. The communication device 921 is a communication card for, for example, a wired or wireless LAN (Local Area Network), Bluetooth (registered trademark), or a WUSB (Wireless USB). In addition, the communication device 921 may be a router for optical communication, a router for ADSL (Asymmetric Digital Subscriber Line), a modem for various kinds of communication, or the like. The communication device 921 can transmit and receive signals and the like based on a predetermined protocol, for example, TCP, IP, or the like with, for example, the Internet or other communication devices. Furthermore, the communication network 927 connected to the communication device 921 is configured by a network to which connection is made in a wired or wireless manner, and may be, for example, the Internet, a household LAN, infrared communication, radio wave communication, satellite communication, or the like. In the present embodiment, the information processing apparatus 10 may receive content data, text data, or the like via the communication device 921, for example.

Further, although not specified in FIG. 6, the information processing apparatus 10 according to the present embodiment may further include the configuration as below.

The drive 923 is a reader/writer for recording media, and built in or externally connected to the information processing apparatus 10. The drive 923 corresponds to the drive described in <3. Functions and Configuration of Information Processing Apparatus> described above, for example. The drive 923 reads information recorded on the removable recording medium 929 such as a magnetic disk, an optical disc, a magneto-optical disc, or a semiconductor memory loaded therein, and outputs the information to the RAM 905. In addition, the drive 923 can also write records on the removable recording medium 929 such as a magnetic disk, an optical disc, a magneto-optical disc, or a semiconductor memory loaded therein. The removable recording medium 929 is, for example, a DVD medium, an HD-DVD medium, a Blu-ray (registered trademark) medium, or the like. Furthermore, the removable recording medium 929 may be a CompactFlash (CF) (registered trademark), a flash memory, an SD memory card (Secure Digital memory card), or the like. Moreover, the removable recording medium 929 may be, for example, an IC card (Integrated Circuit card) on which a non-contact-type IC chip is mounted, an electronic device, or the like.

The connection port 925 is a port for connecting devices directly to the information processing apparatus 10. As an example of the connection port 925, there is a USB (Universal Serial Bus) port, an IEEE 1394 port, an SCSI (Small Computer System Interface) port, or the like. As another example of the connection port 925, there is an RS-232C port, an optical audio terminal, an HDMI (High-Definition Multimedia Interface) (registered trademark) port, or the like. By connecting the externally connected device 931 to the connection port 925, the information processing apparatus 10 can acquire content data or text data directly from the externally connected device 931, or provide content data or text data to the externally connected device 931.

Hereinabove, the example of the hardware configuration that can realize the functions of the information processing apparatus 10 according to the embodiments of the present disclosure has been introduced. The constituent elements described above may be configured using general-purpose members, or may be configured by software specified in the functions of the constituent elements. Thus, the hardware configuration to be used can be appropriately changed according to technical levels whenever the present embodiment is implemented.

Note that a computer program for realizing the functions of the information processing apparatus 10 according to the present embodiment as described above can be produced or installed in a personal computer or the like. In addition, a recording medium on which such a computer program is stored and which can be read by computers can also be provided. The recording medium is, for example, a magnetic disk, an optical disc, a magneto-optical disc, a flash memory, or the like. In addition, the computer program may be distributed via, for example, a network without using a recording medium.

8. Conclusion

As described above, with the information processing apparatus according to an embodiment of the present disclosure, the playback state controlling method, and the program, the following advantages can be obtained.

With the information processing apparatus, the playback state controlling method, and the program according to the present embodiment, a part or all of the text list corresponding to a content is displayed on the, display screen. In addition, the continuous position change of the operating body on the text list displayed on the display screen is detected. Furthermore, the playback state of the content is controlled based on the continuous position change of the operating body detected on the text list displayed on the display screen. Therefore, a user can control the playback state of the content by performing an operation on the text list. As a result, the user can control the playback state while referring to the text list, that is, while understanding the detail of the content in terms of context, and it is thus possible to control the playback state more according to the context of the content or the intention in a scene, which enables enhancing the convenience of the user.

In addition, with the information processing apparatus, the playback state controlling method, and the program according to the present embodiment, the display of the text list on the display screen is changed based on the continuous position change of the operating body detected on the text list displayed on the display screen. Therefore, the user can intuitively understand which playback state the content is currently in by referring to the changed display of the text list. That is, the display of the text list on the display screen is performed in step with the control of the playback state in response to the continuous position change of the operating body, and thus the user can perform the playback control of the content more intuitively and collectively.

More specifically, with the information processing apparatus, the playback state controlling method, and the program according to the present embodiment, the playback position in the content is controlled based on the text list in response to the drag motion by the operating body in the list direction on the text list displayed on the display screen. Therefore, the user can seek the playback position based on the text list, and it is thus possible to perform a seek according to the context of the content or the intention in a scene, which enables enhancing the convenience of the user.

In addition, more specifically, with the information processing apparatus, the playback state controlling method, and the program according to the present embodiment, some region in the content is subjected to the repeat playback in response to the hold motion by the operating body on the text list displayed on the display screen. Therefore, the user can perform the repeat playback of the content in the units of, for example, text data items based on the text list, which enables enhancing the convenience of the user.

In addition, more specifically, with the information processing apparatus, the playback state controlling method, and the program according to the present embodiment, the playback speed of the content is changed in response to the drag motion by the operating body in the direction orthogonal to the list direction on the text list displayed on the display screen. In addition, with the change in the playback speed of the content, the character spacing of the text data is also changed. For example, when the playback speed of the content is increased, the text data is displayed with the character spacing reduced, or when the playback speed of the content is decreased, the text data is displayed with the character spacing increased. Therefore, the user can grasp whether the content is subjected to the high-speed playback or the slow-motion playback, with the character spacing of the text data intuitively.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the above embodiment, the description has been made about the case where the content data is a video data, and a text list is configured by the text data items associated with the video data, but the present technique is not limited to such an example. For example, the content data may be music (piece of music) data, and the text data may be lyrics associated with the music data.

In addition, the text data may be text data associated with the elapsed time in the playback of the content, and the kind thereof is not limited. For example, in the case where the content is preexisting material like a movie, subtitle data has been already created by the production company of the movie in many cases. In addition, in digital broadcasting, subtitle data may be distributed simultaneously with a content. In these cases, the preexisting pieces of subtitle data may be utilized as the text data, on an as is basis.

In addition, information content contained in one text data item, for example, the number of characters may be freely determined by the user. For example, even in the case where preexisting subtitle data is distributed as described above, the subtitle data may be edited by the user as appropriate to create new text data.

Additionally, the present technology may also be configured as below.

(1) An information processing apparatus including:

a position change detecting unit that detects a position change of an operating body on a screen;

a playback state control unit that controls a playback state of a content; and a display control unit that at least displays a part or all of a text list in which text data items associated with elapsed times in a playback of the content are sorted in an order of the elapsed times, on the screen, wherein the playback state control unit controls the playback state of the content in response to a continuous position change of the operating body detected by the position change detecting unit on the text list displayed by the display control unit.

(2) The information processing apparatus according to (1), wherein the continuous position change of the operating body includes a drag motion in a first-axis direction being a direction in which the text data items in the text list displayed on the screen are arranged, the drag motion in the first-axis direction being a movement of the operating body in the first-axis direction, the display control unit displays the text list while scrolling the text list in the first-axis direction in response to the drag motion in the first-axis direction, and the playback state control unit changes a playback position in the content in response to the display of the scrolled text list.

(3) The information processing apparatus according to (1) or (2), wherein the display control unit subjects at least one of the text data items contained in the text list to focusing display on the screen, and the playback state control unit changes the playback position in the content to a playback position corresponding to the text data item subjected to the focusing display.

(4) The information processing apparatus according to any one of (1) to (3), further including:

a list processing unit that divides the text list into at least one or more blocks based on the text data items and the elapsed times.

(5) The information processing apparatus according to (4), wherein in a case where a time interval between a first text data item and a second text data item in the text list reaches a predetermined interval or more in the text list, the list processing unit divides the text data items between the first text data item and the second text data item.

(6) The information processing apparatus according to (2), wherein the display control unit displays the text list while scrolling the text list in the first-axis direction in units of the text data items in response to the drag motion in the first-axis direction.

(7) The information processing apparatus according to any one of (1) to (6), wherein the continuous position change of the operating body includes a drag motion in second-axis directions orthogonal to a direction in which the text data items in the text list displayed on the screen are arranged, the drag motion in second-axis directions being a movement of the operating body in the second-axis directions, the display control unit displays at least one of the text data items contained in the text list while changing a character spacing of the at least one of the text data items in response to the drag motion in the second-axis directions, and the playback state control unit changes a playback speed of the content in response to the drag motion in the second-axis directions.

(8) The information processing apparatus according to (7), wherein the display control unit displays at least one of the text data items contained in the text list while reducing a character spacing of the at least one of the text data items in response to the drag motion in a first direction out of the second-axis directions, and the playback state control unit increases the playback speed of the content in response to the drag motion in the first direction out of the second-axis directions.

(9) The information processing apparatus according to (7), wherein the display control unit displays at least one of the text data items contained in the text list while increasing a character spacing of the at least one of the text data items in response to the drag motion in a second direction out of the second-axis directions, and the playback state control unit decreases the playback speed of the content in response to the drag motion in the second direction out of the second-axis directions.

(10) The information processing apparatus according to any one of (1) to (9), wherein the continuous position change of the operating body includes a hold motion in which the operating body keeps being detected at one location on the text list displayed on the screen, wherein the display control unit displays the text list without scrolling in response to the hold motion, and the playback state control unit subjects some region in the content to repeat playback in response to the hold motion.

(11) The information processing apparatus according to (10), wherein the playback state control unit subjects the content to the repeat playback in units of the text data items in response to the hold motion.

(12) The information processing apparatus according to (2), wherein the display control unit changes a unit for scrolling in which the text list is scrolled in the first-axis direction and displayed, in accordance with a state of the drag motion in the first-axis direction.

(13) The information processing apparatus according to (12), further including:

a list processing unit that divides the text list into at least one or more blocks based on the text data items and the elapsed times, wherein if a number of the operating bodies detected on the screen is two or more in the drag motion in the first-axis direction, the display control unit displays the text list while scrolling the text list in the first-axis direction in units of the blocks in response to the drag motion in the first-axis direction.

(14) A playback state controlling method including:

displaying a part or all of a text list in which text data items associated with elapsed times in a playback of a content are sorted in an order of the elapsed times, on a screen;

detecting a continuous position change of an operating body on the text list displayed on the screen; and controlling a playback state of the content in response to the continuous position change of the operating body.

(15) A program causing a computer to execute:

displaying a part or all of a text list in which text data items associated with elapsed times in a playback of a content are sorted in an order of the elapsed times, on a screen;

detecting a continuous position change of an operating body on the text list displayed on the screen; and controlling a playback state of the content in response to the continuous position change of the operating body.

REFERENCE SIGNS LIST

10, 20 information processing apparatus
110 display input unit 115, 210 display screen
120 communication unit
130 storage unit
140 control unit
141 data acquiring unit
142 list processing unit
143 position detecting unit
144 position change detecting unit
145 display control unit
146 playback state control unit
500 playback screen display region
600 text list displaying region
310, 610 focused region
320, 620 second text displaying region
330, 630 third text displaying region
340, 640 fourth text displaying region
650 fifth text displaying region

The invention claimed is:

1. An information processing apparatus, comprising:
  circuitry configured to:
    detect a position change of an operating body on a screen;
    control a playback state of a content;
    display a part or all of a text list, in which text data items associated with elapsed times in a playback of the content are sorted in an order of the elapsed times, on the screen;
    control the playback state of the content based on a continuous position change of the operating body detected by the circuitry on the displayed text list;
    wherein the continuous position change of the operating body includes a first drag motion in first-axis directions orthogonal to a direction in which the text data items in the text list displayed on the screen are arranged,
      wherein the first drag motion in the first-axis directions is a movement of the operating body in the first-axis directions;
    display at least one of the text data items contained in the text list while a character spacing of the at least one of the text data items is changed based on the first drag motion in the first-axis directions; and
    change a playback speed of the displayed content based on the first drag motion in the first-axis directions.

2. The information processing apparatus according to claim 1,
  wherein the continuous position change of the operating body includes a second drag motion in a second-axis direction, wherein the second-axis direction is a direction in which the text data items in the text list displayed on the screen are arranged,
  wherein the second drag motion in the second-axis direction is a movement of the operating body in the second-axis direction,
  wherein the circuitry is further configured to:
    display the text list while the text list is scrolled in the second-axis direction based on the second drag motion in the second-axis direction, and
    change a playback position in the content based on the display of the scrolled text list.

3. The information processing apparatus according to claim 1, wherein the circuitry is further configured to:
  focus display of at least one of the text data items contained in the text list on the screen, and
  change a playback position in the content to a playback position that corresponds to a focused text data item of the text data items.

4. The information processing apparatus according to claim 1, wherein the circuitry is further configured to:
  divide the text list into at least one block based on the text data items and the elapsed times.

5. The information processing apparatus according to claim 4, wherein the circuitry is further configured to divide, based on a time interval between a first text data item in the text list and a second text data item in the text list reaches an interval or more in the text list, text data items between the first text data item and the second text data item.

6. The information processing apparatus according to claim 2, wherein the circuitry is further configured to display the text list while the text list is scrolled in the second-axis direction in units of the text data items based on the second drag motion in the second-axis direction.

7. The information processing apparatus according to claim 1, wherein the circuitry is further configured to:
  display at least one of the text data items contained in the text list while the character spacing of the at least one of the text data items is reduced based on the first drag motion in a first direction out of the first-axis directions; and
  increase the playback speed of the content based on the first drag motion in the first direction out of the first-axis directions.

8. The information processing apparatus according to claim 1, wherein the circuitry is further configured to:
  display at least one of the text data items contained in the text list while the character spacing of the at least one of the text data items is increased based on the second drag motion in a second direction out of the first-axis directions; and
  decrease the playback speed of the content based on the second drag motion in the second direction out of the first-axis directions.

9. The information processing apparatus according to claim 1,
  wherein the continuous position change of the operating body includes a hold motion in which the operating body is detected at one location on the text list displayed on the screen for a time interval, wherein
  wherein the circuitry is further configured to:
    display the text list based on a lack of a scroll operation and the hold motion, and
    repeat playback of a region in the content based on the hold motion.

10. The information processing apparatus according to claim 9, wherein the repeat playback is in units of the text data items.

11. The information processing apparatus according to claim 2, wherein the circuitry is further configured to change a unit for a scroll operation in which the text list is scrolled in the second-axis direction and displayed, based on a state of the second drag motion in the second-axis direction.

12. The information processing apparatus according to claim 11,
  wherein the circuitry is further configured to divide the text list into at least one block based on the text data items and the elapsed times,
  wherein the circuitry is further configured to display, based on a number of operating bodies detected on the screen is at least two in the second drag motion in the second-axis direction, the text list in units of the at least one block, while the scroll operation of the text list is in the second-axis direction, based on the second drag motion in the second-axis direction.

13. A playback state controlling method, comprising:
   displaying a part or all of a text list in which text data items associated with elapsed times in a playback of a content are sorted in an order of the elapsed times, on a screen;
   detecting a continuous position change of an operating body on the text list displayed on the screen;
   controlling a playback state of the content based on the continuous position change of the operating body,
      wherein the continuous position change of the operating body includes a first drag motion in first-axis directions orthogonal to a direction in which the text data items in the text list displayed on the screen are arranged,
      wherein the first drag motion in the first-axis directions is a movement of the operating body in the first-axis directions;
   displaying at least one of the text data items contained in the text list while a character spacing of the at least one of the text data items is changed based on the first drag motion in the first-axis directions; and
   changing a playback speed of the displayed content based on the first drag motion in the first-axis directions.

14. A non-transitory computer-readable medium having stored thereon computer-executable instructions, which when executed by a computer cause the computer to execute operations, the operations comprising:
   displaying a part or all of a text list in which text data items associated with elapsed times in a playback of a content are sorted in an order of the elapsed times, on a screen;
   detecting a continuous position change of an operating body on the text list displayed on the screen;
   controlling a playback state of the content based on the continuous position change of the operating body;
      wherein the continuous position change of the operating body includes a first drag motion in first-axis directions orthogonal to a direction in which the text data items in the text list displayed on the screen are arranged,
      wherein the first drag motion in the first-axis directions is a movement of the operating body in the first-axis directions;
   displaying at least one of the text data items contained in the text list while a character spacing of the at least one of the text data items is changed based on the first drag motion in the first-axis directions; and
   changing a playback speed of the displayed content based on the first drag motion in the first-axis directions.

* * * * *